(12) United States Patent
Oda et al.

(10) Patent No.: US 12,494,964 B2
(45) Date of Patent: Dec. 9, 2025

(54) COMMUNICATION SYSTEM, COMMUNICATION METHOD AND PROGRAM

(71) Applicant: NTT, Inc., Tokyo (JP)

(72) Inventors: Takuya Oda, Musashino (JP); Takuya Ohara, Musashino (JP); Fumikazu Inuzuka, Musashino (JP); Katsuaki Higashimori, Musashino (JP); Kengo Shintaku, Musashino (JP)

(73) Assignee: NTT, Inc., Tokyo (JP)

( * ) Notice: Subject to any disclaimer, the term of this patent is extended or adjusted under 35 U.S.C. 154(b) by 22 days.

(21) Appl. No.: 18/565,892

(22) PCT Filed: Jun. 28, 2021

(86) PCT No.: PCT/JP2021/024338
§ 371 (c)(1),
(2) Date: Nov. 30, 2023

(87) PCT Pub. No.: WO2023/275930
PCT Pub. Date: Jan. 5, 2023

(65) Prior Publication Data
US 2024/0275671 A1 Aug. 15, 2024

(51) Int. Cl.
*H04L 41/0816* (2022.01)
*H04B 10/27* (2013.01)
*H04L 41/40* (2022.01)

(52) U.S. Cl.
CPC ......... *H04L 41/0816* (2013.01); *H04B 10/27* (2013.01); *H04L 41/40* (2022.05)

(58) Field of Classification Search
None
See application file for complete search history.

(56) References Cited

U.S. PATENT DOCUMENTS

2022/0303246 A1* 9/2022 Miriyala ............. H04L 63/0263
2022/0345374 A1* 10/2022 Venkata .................. H04L 41/40

OTHER PUBLICATIONS

Hideki Kasahara et al., "Network Core Technologies for a Next Generation Network", NTT Technical Review, Apr. 2007, pp. 38-43.

* cited by examiner

*Primary Examiner* — Fadi Haj Said

(57) ABSTRACT

A communication system is a communication system that includes: a plurality of transmission devices; a setting server that receives an instruction to change data related to setting of a data network; and a control server that performs a control process related to the plurality of transmission devices and the data network on a basis of the data. In the communication system, a setting processing unit is provided to perform a process for constructing a customer control network between a first transmission device and the setting server by using a second transmission device as a relay device, when the first transmission device and the second transmission device are connected by an optical transmission line. The first transmission device includes: a connection processing unit that performs a process for constructing a control network between the first transmission device and the control server by using the second transmission device as a relay device, when the first transmission device and the second transmission device are connected by the optical transmission line; and a device control unit that performs a process for constructing the data network for the first transmission device by using the second transmission device as a relay device, when the first transmission device and the second transmission device are connected by the optical transmission line.

6 Claims, 25 Drawing Sheets

FIG. 3

COMMUNICATION SYSTEM, COMMUNICATION METHOD AND PROGRAM

CROSS-REFERENCE TO RELATED APPLICATIONS

This application is a 371 U.S. National Phase of International Application No. PCT/JP2021/024338, filed on Jun. 28, 2021. The entire disclosure of the above application is incorporated herein by reference.

TECHNICAL FIELD

The present invention relates to a communication system, a communication method, and a program.

BACKGROUND ART

In an optical communication system, transmission devices are connected to one another via an optical transmission line. FIG. 25 is a diagram illustrating a first example of a configuration of a communication system. In FIG. 25, a first transmission device, a second transmission device, and a third transmission device are connected to one another via data lines (optical transmission lines) that are connected directly or indirectly to a data network 501. These transmission devices are controlled by a control server via a control network 500. The control network 500 is a communication network different from the data network 501 for data communication.

There are cases where a user wishes to change data (the communication speed, for example) related to the setting of the data line connected to the first transmission device. In such a case, an arithmetic device accesses a customer control server via the first transmission device and another network (the Internet 502, for example) under a different contract, in response to an operation by the user. A control server 7 centrally manages information regarding networks. The customer control server manages only information regarding external aspects (such as customer information and contracted service information). Accordingly, the customer control server transmits a setting request to the control server 7. The control server 7 derives data on the basis of the setting request, and gives an instruction to a transmission device under its control. As the transmission device under the control executes the instruction, the data network 501 is reconstructed.

FIG. 26 is a diagram illustrating a second example of a configuration of a communication system. In a case where a user wishes to change data related to the setting of the data line of the first transmission device, a setting device installed in the office of the user accesses the customer control server via another network under another contract. In FIG. 26, the data network 501 is also reconstructed as in FIG. 25. Note that the setting device and the arithmetic device installed in the office of the user may be the same device.

CITATION LIST

Non Patent Document

Non Patent Document 1: Hideki Kasahara and four others, "Network Infrastructure Technologies for Next Generation Networks", NTT Technical Journal, April 2007, pp. 38-43

SUMMARY OF INVENTION

Technical Problem

All of the control network, the data network, and the transmission devices form communication networks under the control of a communications company (a communications services company). Therefore, the communication path design and the communication path construction of these communication networks are conducted primarily by the communications company.

Here, there are cases where a transmission device of a new user is connected to a communication network after the communications company has constructed the communication network. In this case, it is difficult for the communications company to construct a communication network in a short period of time. For example, during a busy time of the year, it might take several weeks for the communications company to reconstruct a communication network for a new user. In such a case, a user cannot promptly use and change communication services.

In view of the above circumstances, the present invention aims to provide a communication system, a communication method, and a program for enabling a user to quickly use and change communication services.

Solution to Problem

An embodiment of the present invention is a communication system that includes: a plurality of transmission devices; a setting server that receives an instruction to change data related to setting of a data network; and a control server that performs a control process related to the plurality of transmission devices and the data network on the basis of the data. The plurality of transmission devices includes a first transmission device, and a second transmission device capable of communicating with the setting server and the control server. A setting processing unit is provided to perform a process for constructing a customer control network between the first transmission device and the setting server by using the second transmission device as a relay device, when the first transmission device and the second transmission device are connected by an optical transmission line. The first transmission device includes: a connection processing unit that performs a process for constructing a control network between the first transmission device and the control server by using the second transmission device as a relay device, when the first transmission device and the second transmission device are connected by the optical transmission line; and a device control unit that performs a process for constructing the data network for the first transmission device by using the second transmission device as a relay device, when the first transmission device and the second transmission device are connected by the optical transmission line.

An embodiment of the present invention is a communication method implemented by a communication system that includes: a plurality of transmission devices; a setting server that receives an instruction to change data related to setting of a data network; and a control server that performs a control process related to the plurality of transmission devices and the data network on a basis of the data. The plurality of transmission devices includes a first transmission device, and a second transmission device capable of communicating with the setting server and the control server. The communication method includes a setting processing step of performing a process for constructing a customer control network between the first transmission device and the setting server by using the second transmission device as a relay device, when the first transmission device and the second transmission device are connected by an optical transmission line. The first transmission device performs a process for constructing a control network between the first transmission device and the control server by using the second transmission device as a relay device when the first transmission device and the second transmission device are connected by the optical transmission line, and performs a process for constructing the data network for the first transmission device by using the second transmission device as a relay device when the first transmission device and the second transmission device are connected by the optical transmission line.

An embodiment of the present invention is a program for causing a computer to function as the above communication system.

Advantageous Effects of Invention

According to the present invention, a user can quickly use and change communication services.

BRIEF DESCRIPTION OF DRAWINGS

FIG. 3 is a diagram illustrating a second example of arrangement of data contained in an ODU frame of ITU-T Recommendation G.709.1 (FlexO) in the first embodiment.

DESCRIPTION OF EMBODIMENTS

Embodiments of the present invention are described below in detail, with reference to the drawings.

First Embodiment

Figure 1:
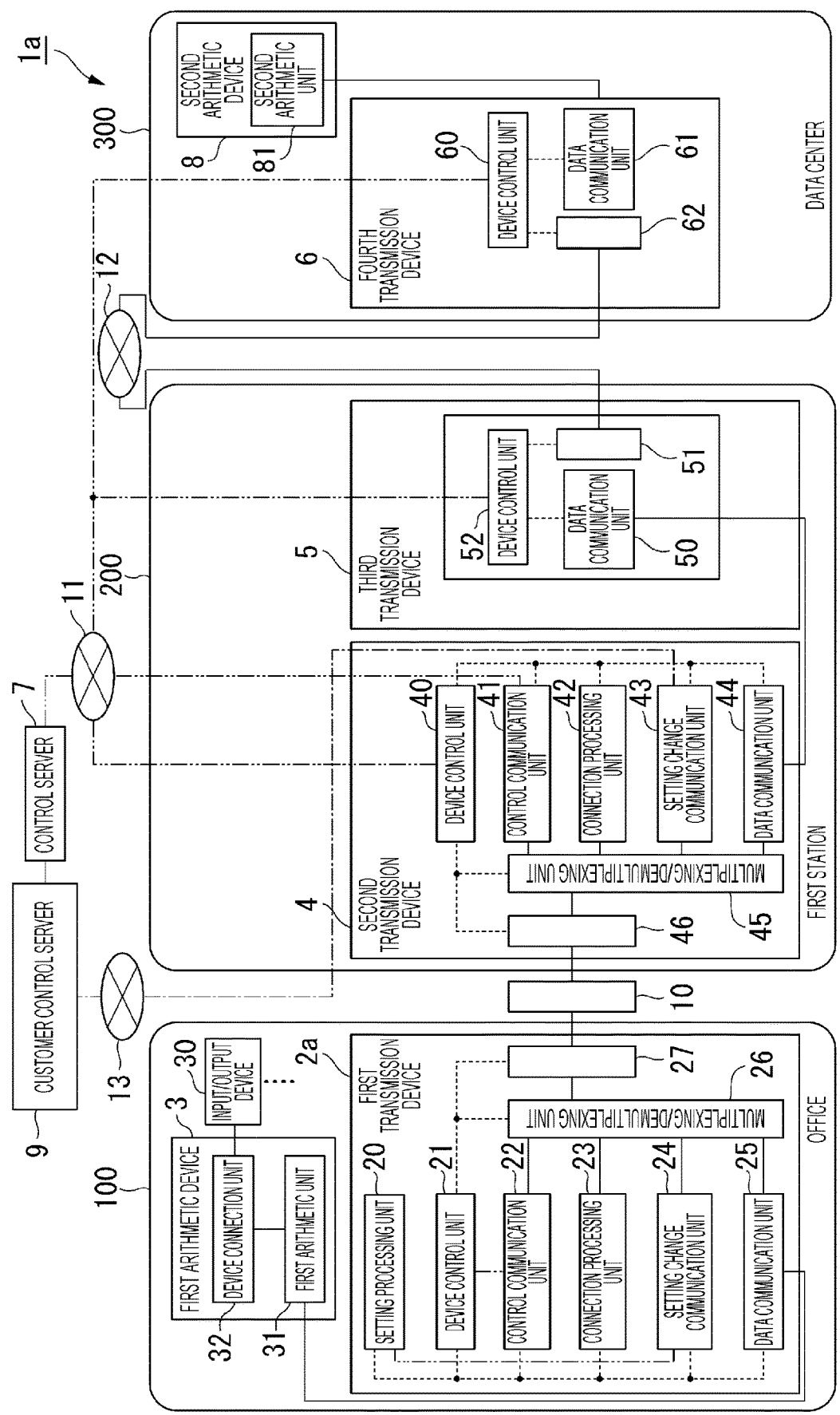
FIG. 1 is a diagram illustrating an example configuration of a communication system in a first embodiment.

FIG. 1 is a diagram illustrating an example configuration of a communication system 1*a*. The communication system 1*a* includes a first transmission device 2*a*, a first arithmetic device 3, a second transmission device 4, a third transmission device 5, a fourth transmission device 6, a control server 7, a second arithmetic device 8, a customer control server 9, an optical transmission line 10, a control network 11, a data network 12, and a customer control network 13.

The second transmission device 4, the third transmission device 5, the fourth transmission device 6, the control server 7, and the customer control server 9 are managed by the same communications company, for example. The first transmission device 2*a* may be prepared by a user, or may be prepared by the communications company.

The first transmission device 2*a* includes a setting processing unit 20, a device control unit 21, a control communication unit 22, a connection processing unit 23, a setting change communication unit 24, a data communication unit 25, a multiplexing/demultiplexing unit 26, and an optical signal communication unit 27.

The first arithmetic device 3 includes a first arithmetic unit 31 and a device connection unit 32. The device connection unit 32 is connected to an input/output device 30. The number of the input/output devices 30 may be plural. The first arithmetic device 3 may include at least one of the functional units (not illustrated) in the input/output device 30.

The second transmission device 4 includes a device control unit 40, a control communication unit 41, a connection processing unit 42, a setting change communication unit 43, a data communication unit 44, a multiplexing/demultiplexing unit 45, and an optical signal communication unit 46.

The third transmission device 5 includes a data communication unit 50, an optical signal communication unit 51, and a device control unit 52.

The fourth transmission device 6 includes a device control unit 60, a data communication unit 61, and an optical signal communication unit 62.

The second arithmetic device 8 includes a second arithmetic unit 81. An input/output device is at least one of a video output device such as a monitor, a keyboard, a mouse, and a sensor, for example.

The first transmission device 2a, the first arithmetic device 3, and the input/output device 30 are provided in the user's facility, for example. In the description below, the user's facility is an office 100 as an example. The setting processing unit 20 may be provided in the office 100 as a device separate from the first transmission device 2a. The second transmission device 4 and the third transmission device 5 are provided in a first station 200 (a relay station) of the communications company, for example. The fourth transmission device 6 and the second arithmetic device 8 are provided in a data center 300 of the communications company, for example.

The first transmission device 2a is an optical network unit (ONU), for example. The first transmission device 2a is physically connected to the optical transmission line 10 by the user. When connected to the optical transmission line 10, the first transmission device 2a temporarily constructs a connection line between the connection processing unit 23 and the connection processing unit 42 in the optical transmission line 10. In the optical transmission line 10 illustrated in FIG. 1, the same optical fiber is used for transmission and reception, but different optical fibers may be used for transmission and reception.

When connected directly or indirectly to the control server 7 via the optical transmission line 10, the first transmission device 2a constructs three kinds of communication networks. For example, using the optical transmission line 10, the first transmission device 2a constructs a control line (the first kind) for the control network 11 between the control communication unit 22 and the control server 7, and between the control communication unit 41 and the control server 7. Using the optical transmission line 10, the first transmission device 2a constructs a data line (the second kind) for the data network 12 between the data communication unit 25 and the second arithmetic device 8, and between the data communication unit 44 and the second arithmetic device 8. Using the optical transmission line 10, the first transmission device 2a constructs a setting change line (the third kind) for the customer control network 13 (a setting network) between the setting change communication unit 24 and the customer control server 9, and between the setting change communication unit 43 and the customer control server 9. In this manner, the first transmission device 2a constructs three kinds of communication networks, without the communications company being the operator. In the description below, the data is not necessarily a specific type of data, but may be a setting value, or may be a command, for example.

The first transmission device 2a transmits data sent from the first arithmetic device 3, to the second transmission device 4 with an optical signal. The first transmission device 2a transmits data sent from the second transmission device 4 with an optical signal, to the first arithmetic device 3 with an electrical signal, for example.

The first arithmetic device 3 is an information processing device, and is a smartphone terminal, a tablet terminal, a laptop computer, or a desktop personal computer, for example. The first arithmetic device 3 is operated by the user. The first arithmetic device 3 transmits data (operation data) corresponding to an operation received by the input/output device 30 to the first transmission device 2a in the uplink direction. The first arithmetic device 3 acquires data transmitted in the downlink direction from the first transmission device 2a. The first arithmetic device 3 performs predetermined processing on the data transmitted in the downlink direction from the first transmission device 2a.

The second transmission device 4 is an optical line terminal (OLT), for example. The second transmission device 4 relays optical signals (data optical signals) being transmitted between the first transmission device 2a and the third transmission device 5, and between the first transmission device 2a and the fourth transmission device 6. The second transmission device 4 (a connection request receiving device) also transfers a connection request (a connection optical signal) transmitted from the first transmission device 2a to the control server 7. Note that the second transmission device 4 may convert an optical signal transmitted from the first transmission device 2a into an electrical signal, and transmit the electrical signal to the control server 7.

Each of the third transmission device 5 and the fourth transmission device 6 is an optical communication device. The third transmission device 5 relays an optical signal (a data optical signal) being transmitted between the second transmission device 4 and the fourth transmission device 6. Note that the third transmission device 5 and the fourth transmission device 6 as connection request receiving devices may transfer connection requests (connection optical signals) transmitted from the first transmission device 2a to the control server 7.

The control server 7 controls operations of the respective transmission devices and the data network 12. As a result, the control server 7 can control the communication speed, the communication path, the connection destination, and the like of a data line connected to the data network 12, for example.

The second arithmetic device 8 is a data server, for example. The second arithmetic device 8 transmits data requested from the first arithmetic device 3 to the fourth transmission device 6.

The customer control server 9 (a setting server) receives, from the setting processing unit 20, an instruction to change data related to the setting of the data network 12. The data related to the setting of the data network 12 is data of communication speed, for example. The customer control server 9 transmits a setting change instruction (a setting request) related to the data network, to the control server 7.

The optical transmission line 10 is a transmission line including an optical fiber. The control network 11 is a communication network for the control server 7 to control each transmission device and the data network 12. The data network 12 is a communication network to be used for data communication. The customer control network 13 is a communication network for the customer control server 9 to receive an instruction to change data related to the setting of the data network 12.

Next, each of the devices is described in detail.

[First Transmission Device 2a]

The device control unit 21 (a control unit) determines whether the first transmission device 2a is connected to the optical transmission line 10.

For example, the optical signal communication unit 27 outputs light, and the optical signal communication unit 46 detects the light. After that, the optical signal communication unit 27 detects the light transmitted from the optical signal communication unit 46, the device control unit 21 determines that the first transmission device 2a and the second transmission device 4 are connected. That is, the device control unit 21 determines that the first transmission device 2a is connected to the optical transmission line 10. Note that the signals to be transmitted and received between the functional units of the first transmission device 2a, the signals to be transmitted and received between the functional units of the second transmission device 4, the signals to be transmitted and received between the functional units of the third transmission device 5, and the signals to be transmitted and received between the functional units of the fourth transmission device 6 may be electrical signals, or may be optical signals.

For example, the device control unit 21 may determine that the first transmission device 2a is connected to the optical transmission line 10 in a case where light with a predetermined intensity or higher is detected in the multiplexing/demultiplexing unit 26 (an interface).

The device control unit 21 acquires a predetermined instruction from the control server 7, using a control line constructed between the control communication unit 22 and the control server 7. On the basis of the predetermined instruction acquired from the control server 7, the device control unit 21 controls operations of the respective functional units of the first transmission device 2a.

In a case where the first transmission device 2a is connected to the optical transmission line 10, the connection processing unit 23 temporarily constructs a connection line between the connection processing unit 42 and the connection processing unit 23, using the optical transmission line 10.

In a case where the first transmission device 2a is connected to the optical transmission line 10, the connection processing unit 23 constructs a control line between the device control unit 21 and the control server 7, using the optical transmission line 10. The protocol to be used for a connection request or the like by the connection processing unit 23 is not limited to any specific protocol, but may be a session initiation protocol (SIP), for example.

In the optical transmission line 10, signals of communication networks (signals of three kinds of communication networks), which are the control network 11, the data network 12, and the customer control network 13, are multiplexed into an optical signal. The multiplexing method may be accommodation in an optical channel data unit (ODU) frame, time-division multiplexing, or wavelength-division multiplexing, for example.

By the accommodation into an ODU frame, the data related to the setting of the control network and the data related to the setting of the customer control network are accommodated in at least one of the overhead and the payload area of the ODU frame.

Figure 2:
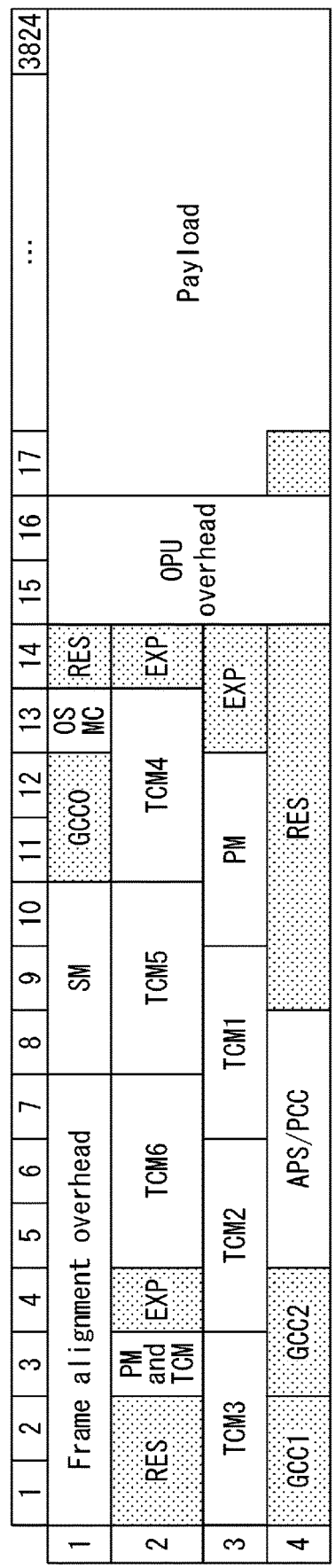
FIG. 2 is a diagram illustrating a first example of arrangement of data contained in an ODU frame of ITU-T Recommendation G.709 (OTUk and OTUc) in the first embodiment.

FIG. 2 is a diagram illustrating a first example of arrangement of data contained in an ODU frame of ITU-T Recommendation G.709 (an optical transport unit k ((OTUk) and an optical transport unit c (OTUc)). For example, data is stored in a partial region or the entire region of a predetermined bit area (GCC0, GCC1, GCC2, RES, EXP, and a predetermined area in the payload area) according to the definition of an ODU frame illustrated in FIG. 2. Here, "Payload" represents the payload area.

Figure 3:
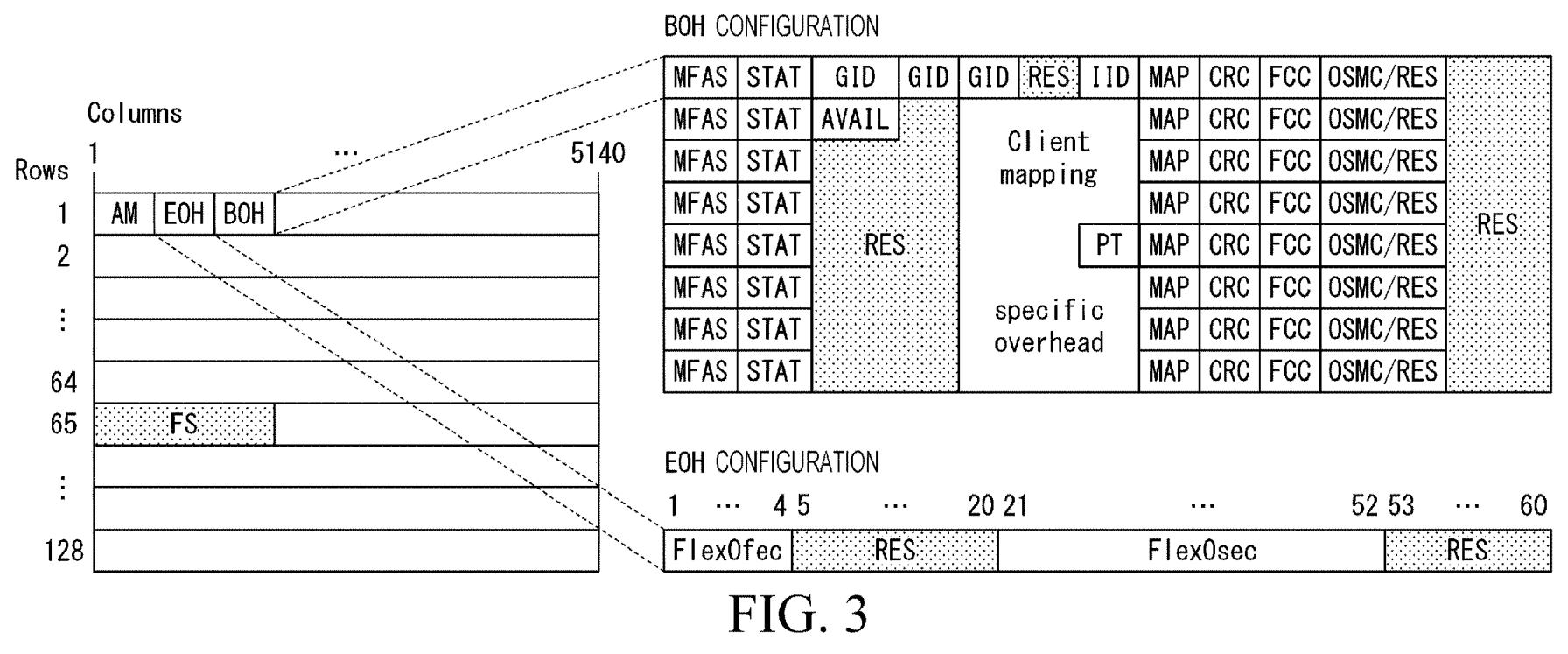

FIG. 3 is a diagram illustrating a second example of arrangement of data contained in an ODU frame of ITU-T Recommendation G.709.1 (FlexO). For example, data is stored in a partial region or the entire region of a predetermined bit area (FS, RES in EOH, and RES in BOH) according to the definition of an ODU frame illustrated in FIG. 3. Here, "OH" represents the overhead area. "FS" represents the "Fixed Stuff" area (a fixed stuffing area).

By the time-division multiplexing, signals being transmitted in the optical transmission line 10 are divided by time slots. Signals of different communication networks are transmitted on a slot basis. The number of allocated slots may vary for each communication network. For example, 98% of the allocatable slots are allocated to signals of the data network 12. Meanwhile, 2% of the allocatable slots are allocated to signals of the control network 11 and signals of the customer control network 13. These values are merely an example. Further, in a case where the control server 7 instructs each transmission device on the ratio of the numbers of slots adjusted in advance, the control server 7 may dynamically change the ratio of the numbers of slots after each communication network is constructed.

By the wavelength-division multiplexing, a wavelength of an optical signal is allocated to each communication network. Note that, in the control network 11, an optical supervisory channel (OSC) defined in ITU-T Recommendation G.709 may be used, for example. The single optical signal communication unit 27 may transmit and receive light of a plurality of wavelengths, or a plurality of optical signal communication units 27 corresponding to the respective wavelengths may transmit and receive light of a plurality of wavelengths.

At least two method among the accommodation in an ODU frame (multiplexing), the time-division multiplexing, and the wavelength-division multiplexing may be used in combination. For example, where the wavelength-division multiplexing is used, optical signals of a first wavelength may be transmitted in the data network 12, and optical signals of a second wavelength may be transmitted in the control network 11 and the customer control network 13. Alternatively, where the time-division multiplexing is used, an optical signal of the second wavelength transmitted through the control network 11 and an optical signal of the second wavelength transmitted through the customer control network 13 may be multiplexed.

The data of optical signals to be transmitted in the control network 11 and the data of optical signals in the customer control network 13 may be encapsulated. These pieces of data may be encapsulated in an Internet Protocol (IP) packet (RFC 2460), a Media Access Control (MAC) frame (IEEE (Institute of Electrical and Electronics Engineers) 802.3), a Generic Framing Procedure (GFP) frame (ITU-T G.7041) of a Point-to-Point Protocol (PPP) (Request For Comments (RFC) 1661), or the like, before the multiplexing. In a case where data is encapsulated by the accommodation in an ODU frame, the data may be accommodated in the same frame area in a logically multiplexed format (a format of virtual local area network (VLAN) multiplexing, for example).

The optical signal communication unit 27 (optical signal communicator) transmits an optical signal transmitted from the first transmission device 2a to the optical signal communication unit 46, using the optical transmission line 10.

The optical signal communication unit 27 transmits a signal transmitted from the optical signal communication unit 46 to the multiplexing/demultiplexing unit 26 (multiplexer/demultiplexer).

The multiplexing/demultiplexing unit 26 demultiplexes a connection processing signal transmitted through a connection line (a connection processing signal transmitted from the second transmission device 4), on the basis of a predetermined multiplexing method. The multiplexing/demultiplexing unit 26 transmits the demultiplexed connection processing signal to the connection processing unit 23. The multiplexing/demultiplexing unit 26 multiplexes the connection processing signal acquired from the connection processing unit 23, on the basis of the predetermined multiplexing method. The multiplexing/demultiplexing unit 26 transmits the multiplexed connection processing signal to the optical signal communication unit 27. Note that, in the initial setting of the multiplexing/demultiplexing unit 26, a signal input from the outside of the first transmission device 2a may be unconditionally input to the connection processing unit 23, and a signal output from the connection processing unit 23 may be unconditionally output as an output signal to the outside of the first transmission device 2a.

The multiplexing/demultiplexing unit 26 demultiplexes a control signal transmitted through a control line (a control signal transmitted from the control server 7), on the basis of the predetermined multiplexing method. The multiplexing/demultiplexing unit 26 transmits the demultiplexed control signal to the control communication unit 22. The multiplexing/demultiplexing unit 26 multiplexes the control signal acquired from the control communication unit 22, on the basis of the predetermined multiplexing method. The multiplexing/demultiplexing unit 26 transmits the multiplexed control signal to the optical signal communication unit 27.

The multiplexing/demultiplexing unit 26 demultiplexes a data signal transmitted through a data line (a data signal transmitted from the second transmission device 4), on the basis of the predetermined multiplexing method. The multiplexing/demultiplexing unit 26 transmits the demultiplexed data signal to the data communication unit 25. The multiplexing/demultiplexing unit 26 multiplexes the data signal acquired from the data communication unit 25, on the basis of the predetermined multiplexing method. The multiplexing/demultiplexing unit 26 transmits the multiplexed data signal to the optical signal communication unit 27.

The multiplexing/demultiplexing unit 26 demultiplexes a setting signal transmitted through a setting change line (a setting signal transmitted from the customer control server 9), on the basis of the predetermined multiplexing method. The multiplexing/demultiplexing unit 26 transmits the demultiplexed setting signal to the setting change communication unit 24. The multiplexing/demultiplexing unit 26 multiplexes the setting signal acquired from the setting change communication unit 24, on the basis of the predetermined multiplexing method. The multiplexing/demultiplexing unit 26 transmits the multiplexed setting signal to the optical signal communication unit 27.

The data communication unit 25 performs data communication with the data communication unit 44 of the second transmission device 4, using a data line.

In a case where the first transmission device 2a is connected directly or indirectly to the control server 7, the setting processing unit 20 constructs a setting change line for the customer control network 13 between the first transmission device 2a and the customer control server 9, under the control of the device control unit 21. Here, the device control unit 21 changes a setting value of the multiplexing/demultiplexing unit 26.

[First Arithmetic Device 3]

The input/output device 30 is a predetermined input/output device, and is a keyboard, a display device, an acoustic device, a camera, a sensor, a mouse, or the like, for example. The device connection unit 32 is an interface functional unit. The first arithmetic unit 31 is an arithmetic unit such as a processor. The first arithmetic unit 31 transmits data (operation data) corresponding to an operation received by the input/output device 30, to the data communication unit 25. The first arithmetic unit 31 acquires a signal transmitted from the data communication unit 25. The signal transmitted from the data communication unit 25 is a signal of Ethernet (registered trademark) or the like, for example.

[Second Transmission Device 4]

The device control unit 40 can communicate with the control server 7 via the control network 11. On the basis of an instruction acquired from the control server 7, the device control unit 40 performs predetermined control processing in the second transmission device 4. For example, the device control unit 40 controls the communication speed of a data line connected to the second transmission device 4.

The connection processing unit 42 can communicate with the first transmission device 2a via the optical transmission line 10. The connection processing unit 42 transfers a connection request transmitted from the device control unit 21 via the connection processing unit 23, to the control server 7. The connection processing unit 42 transfers information (an approval notification as a reply to the connection request, for example) transmitted from the control server 7, to the device control unit 21 via the connection processing unit 23. Note that, in this case, the multiplexing/demultiplexing setting that enables communication between the connection processing unit 23 and the connection processing unit 42 may be reflected between the multiplexing/demultiplexing unit 26 and the multiplexing/demultiplexing unit 45 in advance. The multiplexing/demultiplexing unit 45 performs multiplexing/demultiplexing processes, like the multiplexing/demultiplexing unit 26. Note that the setting of the multiplexing/demultiplexing unit 45 is changed at the timing synchronized with a timing at which the setting of the multiplexing/demultiplexing unit 26 is changed.

[Third Transmission Device 5]

On the basis of an instruction acquired from the control server 7, the device control unit 52 performs predetermined control processing in the third transmission device 5. For example, the device control unit 52 controls the communication speed of the data network 12 (a data line) connected to the optical signal communication unit 51. The optical signal communication unit 51 transmits an optical signal transmitted in the downlink direction from the optical signal communication unit 62 to the data communication unit 50, using an electrical signal, for example. The data communication unit 50 transmits a signal transmitted in the downlink direction from the optical signal communication unit 51 to the data communication unit 44, using an electrical signal.

The data communication unit 50 transmits a signal transmitted in the uplink direction from the data communication unit 44 to the optical signal communication unit 51, using an electrical signal. The optical signal communication unit 51 transmits a signal transmitted in the uplink direction from the data communication unit 50 to the optical signal communication unit 62, using an optical signal.

[Fourth Transmission Device 6]

On the basis of an instruction acquired from the control server 7, the device control unit 60 performs predetermined control processing in the fourth transmission device 6. For example, the device control unit 60 controls the communication speed of the data network 12 connected to the optical signal communication unit 62. The optical signal communication unit 62 transmits an optical signal transmitted in the uplink direction from the optical signal communication unit 51 to the data communication unit 61, using an electrical signal, for example. The data communication unit 61 transmits a signal transmitted in the uplink direction from the optical signal communication unit 51 to the second arithmetic device 8, using an electrical signal.

The data communication unit 61 transmits a signal transmitted in the downlink direction from the second arithmetic device 8 to the optical signal communication unit 62, using an electrical signal. The optical signal communication unit 62 transmits a signal transmitted in the downlink direction from the data communication unit 61 to the optical signal communication unit 51, using an optical signal.

[Second Arithmetic Device 8]

The second arithmetic unit 81 transmits predetermined data in the downlink direction to the fourth transmission device 6. For example, the second arithmetic unit 81 transmits data requested from the first arithmetic device 3, in the downlink direction to the fourth transmission device 6. The second arithmetic unit 81 acquires predetermined data transmitted in the uplink direction from the fourth transmission device 6.

Next, an example operation of the communication system 1a is described.

Figure 4:
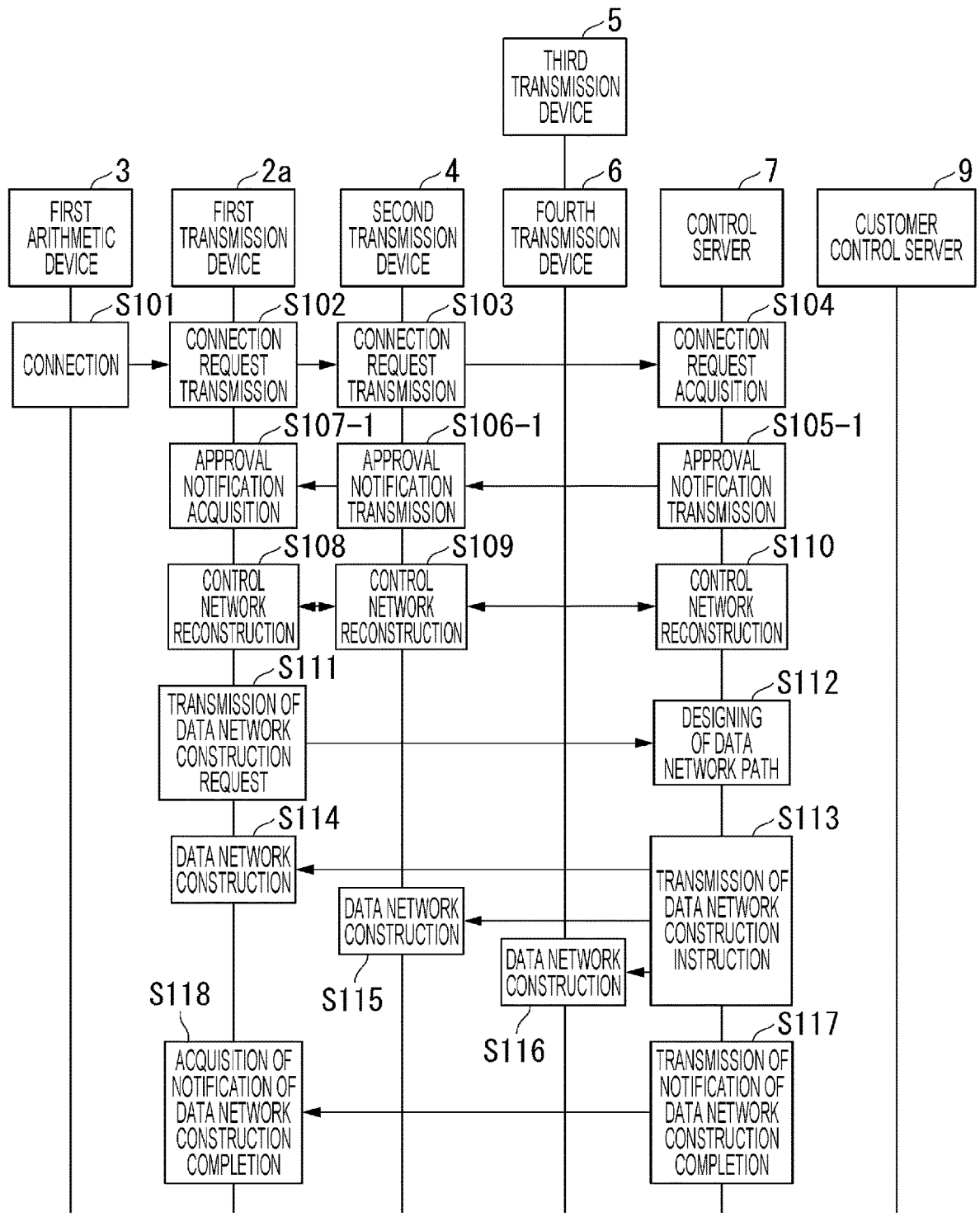
FIG. 4 is a sequence diagram illustrating an example operation of constructing lines of a control network and a data network in the first embodiment.

FIG. 4 is a sequence diagram illustrating an example operation of constructing lines of the control network 11 and the data network 12 (construction of communication paths of a control line and a data line). The user of the first arithmetic device 3 connects the first transmission device 2a to the optical transmission line 10 (step S101). The first transmission device 2a transmits a connection request to the second transmission device 4 via a connection line. The signal of the connection request may include an Internet Protocol (IP) address of the first transmission device 2a, for example. The signal of the connection request may include information (information for approval, for example) that has been input beforehand by the user (step S102). The second transmission device 4 transmits a connection request to the control server 7 (step S103). The control server 7 acquires the connection request, and determines whether to approve or whether to reject connection of the first arithmetic device 3, on the basis of the acquired connection request (step S104).

On the basis of the result of the determination in step S104, the control server 7 transmits an approval notification as a reply to the connection request, to the second transmission device 4 (step S105-1). The second transmission device 4 transmits the approval notification as a reply to the connection request, to the first transmission device 2a (step S106-1). The first transmission device 2a acquires the approval notification as a reply to the connection request (step S107-1).

The first transmission device 2a constructs a control line. Constructing a control line means that the setting of the multiplexing/demultiplexing unit 26 of the first transmission device 2a and the setting of the multiplexing/demultiplexing unit 45 of the second transmission device 4 are changed on the basis of an instruction from the control server 7, and communication is enabled between the control server 7 and the device control unit 21.

In this case, the device control unit 21 of the first transmission device 2a receives an instruction from the control server 7 via a connection line set between the connection processing unit 42 and the connection processing unit 23. Eventually, the device control unit 21 changes the setting of the multiplexing/demultiplexing unit 26, on the basis of the instruction. Also, the device control unit 40 of the second transmission device 4 acquires an instruction from the control server 7. The device control unit 40 changes the setting of the multiplexing/demultiplexing unit 45, on the basis of the contents of the instruction. Here, both the settings of the multiplexing/demultiplexing unit 26 and the multiplexing/demultiplexing unit 45, and the setting of the control server 7 might be changed. Note that, as in a case where a control signal passes through a control line after its construction, a control signal may be communicated between the first transmission device 2a and the control server 7 via a connection line.

An instruction for the first transmission device 2a and a setting change are made in step S108, an instruction for the second transmission device 4 and a setting change are made in step S109, and a setting change to the control server 7 is made in step S110. Through the setting changes in these steps, a connection is established between the first transmission device 2a and the control server 7 via the control line and the control network 11.

The first transmission device 2a transmits a request for construction of a data network to the control server 7 via the control line (step S111). The control server 7 designs a communication path for the data network 12, on the basis of the request for construction of a data network (step S112). On the basis of a result of the communication path design, the control server 7 transmits an instruction to construct a data network (a data line) to the first transmission device 2a (step S113).

The control server 7, each transmission device, and the like construct the data network 12 through the respective example steps described in the following (1) to (4).

(1) The control server 7 designs a communication path on the basis of the construction contents of the requested data network 12 (determines a communication path and a band, or determines the transmission devices that need setting).

(2) The control server 7 creates the contents of instructions directed to the transmission devices (determines the contents of the respective instructions related to the changes, for all the transmission devices that need changes). Note that the instruction contents may include specific data to be used in the transmission devices and setting commands to be executed in the transmission devices. Further, in a case where another system that manages the transmission devices is present between the management server and the transmission devices, the instruction contents may include the contents of instructions directed to the system.

(3) The control server 7 transmits the instruction contents determined in the above step (2) to all the transmission devices that need changing data. Here, the instruction contents may vary for each device.

(4) The setting changes based on the instruction contents are made in all the transmission devices that have received the instructions, so that the data network 12 is constructed.

An instruction to the first transmission device 2a and a setting change are made in step S114, an instruction to the second transmission device 4 and a setting change are made in step S115, and instructions to the third transmission device 5 and the fourth transmission device 6, and setting changes are made in step S116. Through the setting changes made in these steps, the construction of a communication path from the first transmission device 2a to the fourth transmission device 6 via the data line is completed. The control server 7 transmits a notification of completion of data network construction to the first transmission device 2a via the control line (step S117). The first transmission device 2a acquires the notification of completion of data network construction (step S118).

Figure 5:
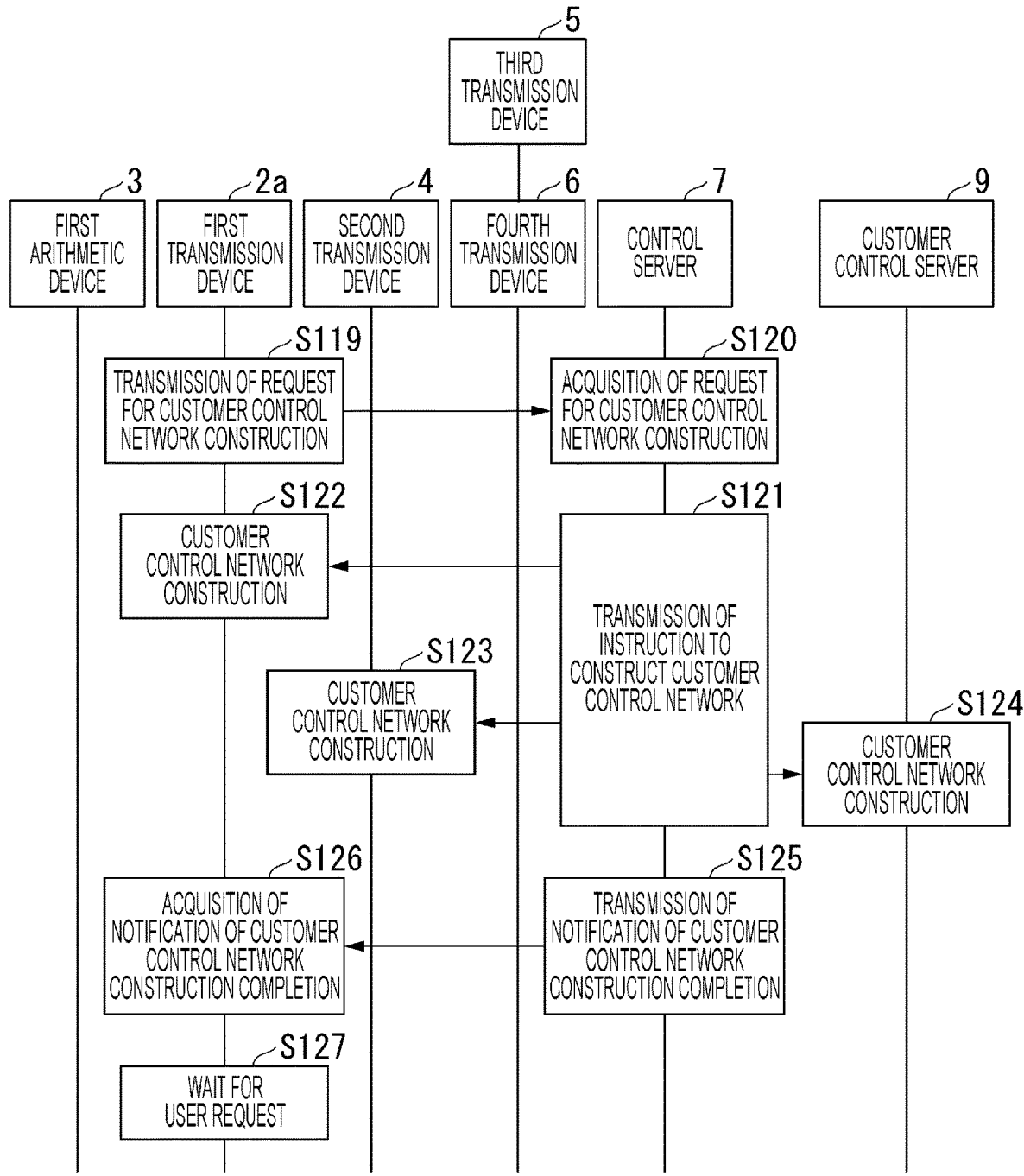
FIG. 5 is a sequence diagram illustrating an example operation of constructing a line of a customer control network in the first embodiment.

FIG. 5 is a sequence diagram illustrating an example operation of constructing a line (construction of a communication path for a setting change line) of the customer control network 13. The first transmission device 2a transmits a request for construction of a customer control network to the control server 7 via the control line (step S119). The control server 7 acquires the request for construction of a customer control network (step S120). The control server 7 transmits an instruction to construct a customer control network to the first transmission device 2a and the second transmission device 4 (step S121), like the instruction to construct the control network 11 in step S110.

On the basis of the instruction to construct a customer control network, the device control unit 21 of the first transmission device 2a changes the setting of the multiplexing/demultiplexing unit 26 (step S122). On the basis of the instruction to construct a customer control network, the device control unit 40 of the second transmission device 4 changes the setting of the multiplexing/demultiplexing unit 45 (step S123).

On the basis of the instruction from the control server 7, the customer control server 9 changes the setting of the customer control server 9 so as to enable communication between the first transmission device 2a and the customer control server 9 via the customer control network 13 (step S124). Through the setting changes made in these steps, a connection between the first transmission device 2a and the customer control server 9 is established via the setting change line and the customer control network 13. Note that communication between the first transmission device 2a and the customer control server 9 may be conducted via the setting change communication unit 43. In that case, the control line is connected to the setting change communication unit 43 via the multiplexing/demultiplexing unit 45. The control server 7 transmits a notification of completion of the customer control network construction to the first transmission device 2a (step S125).

The first transmission device 2a acquires the notification of completion of the customer control network construction (step S126). The first transmission device 2a waits for acquisition of a user request (a request to change data, for example) (step S127). Only the control network 11 and the customer control network 13 may be constructed, and the data network 12 may be constructed after a user request. Alternatively, the data network 12 may be constructed only for the section between the first transmission device 2a and the second transmission device 4, and the first transmission device 2a, the second transmission device 4 and the third transmission device 5, and the data network 12 may be connected after a user request. After the construction of the control network 11, the customer control network 13 may be constructed first, followed by the data network 12.

Figure 6:
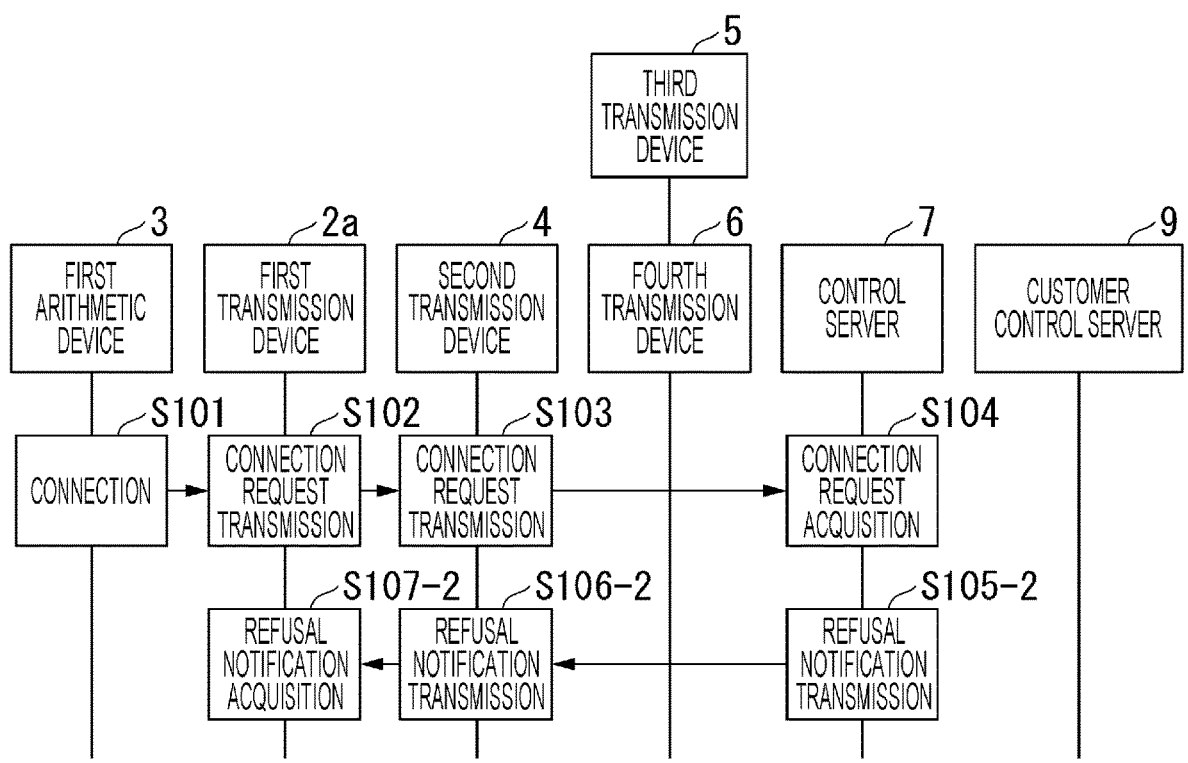
FIG. 6 is a sequence diagram illustrating an example connection refusal operation in the first embodiment.

FIG. 6 is a sequence diagram illustrating an example operation of refusing a connection. The respective operations from step S101 to step S104 are the same as the respective operations from step S101 to step S104 illustrated in FIG. 4.

On the basis of the result of the determination in step S104, the control server 7 transmits a refusal notification as a reply to the connection request, to the second transmission device 4 (step S105-2). The second transmission device 4 transmits the refusal notification as a reply to the connection request, to the first transmission device 2a (step S106-2). The first transmission device 2a acquires the refusal notification as a reply to the connection request (step S107-2).

Figure 7:
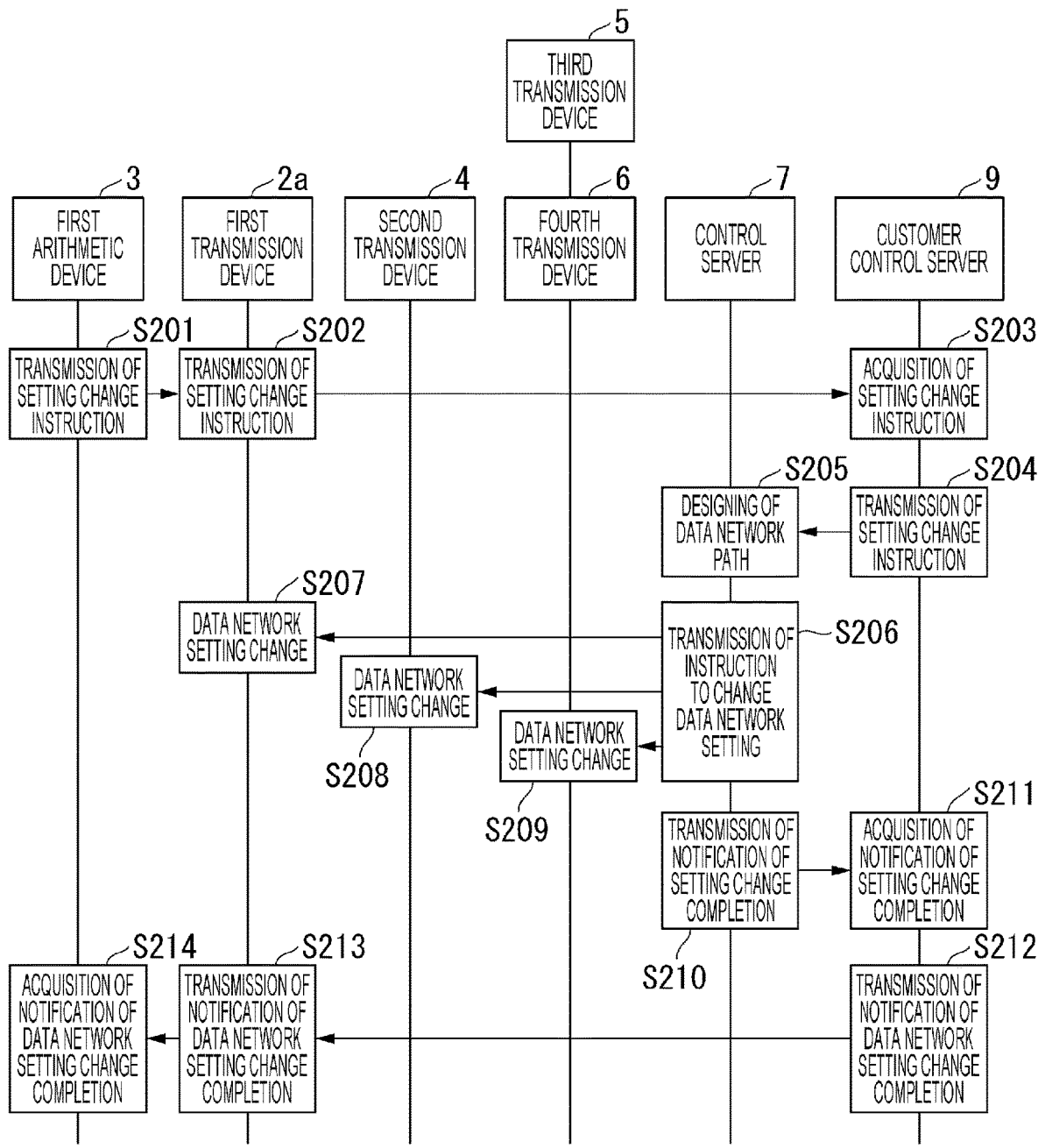
FIG. 7 is a sequence diagram illustrating an example operation of changing the setting of the data network in the first embodiment.

FIG. 7 is a sequence diagram illustrating an example operation of changing the setting of the data network 12. The first arithmetic device 3 transmits an instruction to change the setting of the data network, to the first transmission device 2a (step S201). The first transmission device 2a transmits the instruction to change the setting of the data network, to the customer control server 9 via the setting change line (step S202). The customer control server 9 acquires the setting change instruction (step S203). The customer control server 9 transmits the instruction to change the setting of the data network (a setting request), to the control server 7 (step S204).

The control server 7 designs a communication path of the data network 12 (step S205). On the basis of a result of the communication path design, the control server 7 transmits an instruction to change the setting of the data network 12 to the devices that need changing the setting (the first transmission device 2a, the second transmission device 4, the third transmission device 5, and the fourth transmission device 6 in this case), like the instruction to construct the data network in step S113 (the respective example steps described above in (1) to (4)) (step S206).

An instruction to the first transmission device 2a and a setting change are made in step S207, an instruction to the second transmission device 4 and a setting change are made in step S208, and instructions to the third transmission device 5 and the fourth transmission device 6, and setting changes are made in step S209. Through the setting changes made in these steps, the construction of a communication path from the first transmission device 2a to the fourth transmission device 6 via the data line is completed. The control server 7 transmits a notification of completion of the setting change in the data network, to the customer control server 9 (step S210). The customer control server 9 acquires the notification of completion of the setting change in the data network (step S211).

The customer control server 9 transmits the notification of completion of the setting change in the data network, to the first transmission device 2a (step S212). The first transmission device 2a transmits the notification of completion of the setting change in the data network, to the first arithmetic device 3 (step S213). The first arithmetic device 3 acquires the notification of completion of the setting change in the data network (step S214).

As described above, the communication system 1a includes a plurality of transmission devices. The plurality of transmission devices includes the first transmission device 2a and the second transmission device 4. The device control unit 40 can communicate with the first transmission device 2a via the optical transmission line 10. The device control unit 40 can communicate with the control server 7 via the control network 11. The device control unit 40 can communicate with the customer control server 9 via the customer control network 13.

In a case where the first transmission device 2a and the second transmission device 4 are connected by the optical transmission line 10, the connection processing unit 23 (connection processor) performs processing for constructing the control network 11 (the control line) between the first transmission device 2a and the control server 7, using the connection line and the connection processing unit 42. In this manner, the connection processing unit 23 performs the processing for constructing the control network 11 (the control line) between the first transmission device 2a and the control server 7, using the second transmission device 4 as a relay device.

In a case where the first transmission device 2a is connected directly or indirectly to the control server 7, the device control unit 21 performs processing for constructing a data line between the first transmission device 2a and the data network 12, using the control line and the control server 7. In this manner, the device control unit 21 performs the processing for constructing the data line between the first transmission device 2a and the data network 12, using the second transmission device 4 as a relay device. The control server 7 performs a control process related to the first transmission device 2a and the data network 12, on the basis of the data related to the setting of the data network 12.

The data communication unit 25 performs communication via the optical transmission line 10 (the data line). For example, the data communication unit 25 acquires a data signal transmitted from the data communication unit 44 of the second transmission device 4, via the multiplexing/demultiplexing unit 26 that performs processing according to a predetermined multiplexing method. For example, the data communication unit 25 transmits a data signal transmitted from the first arithmetic unit 31 to the data communication unit 44 of the second transmission device 4, via the multiplexing/demultiplexing unit 26 that performs processing according to a predetermined multiplexing method.

Under the control of the device control unit 21, the setting processing unit 20 setting processor) performs a process of constructing a setting change line of the customer control network 13 between the first transmission device 2a and the customer control server 9, using the second transmission device 4 as a relay device. The customer control server 9 receives an instruction to change the setting related to the data network 12, from the setting processing unit 20 via the setting change communication unit 24 and the setting change communication unit 43. The customer control server 9 transmits the instruction (a setting request) to change the setting of the data network, to the control server 7.

As described above, when the user simply connects the first transmission device 2a to the optical transmission line 10 in a physical manner, three kinds of communication networks, which are the control line of the control network 11, the data line of the data network 12 (a data communication network), and the setting change line of the customer control network 13, are automatically constructed. That is, three kinds of communication networks are constructed mainly by the user side, rather than by the communications company.

With this arrangement, the user can quickly use and change communication services. Furthermore, the user's setting instruction generated by a transmission device at an end of the network reaches the customer control server 9 without passing through any external network. Thus, the setting of a transmission device in the network can be changed by the user.

Since communication services can be used by the user side preparing a transmission device compatible with the above steps and the communication standard of each communication network, it is possible to lower the costs of the hardware of each transmission device by mass production through generalization or the like. Further, even in a case where the user needs to newly install and change a transmission device, and the setting of the communication equipment is to be changed, the user does not need to prepare another network for changing the setting, and thus, time and costs are saved.

Second Embodiment

A second embodiment differs from the first embodiment in that a setting processing unit is provided in the first station 200 (a station of the communications company). In the second embodiment, the differences from the first embodiment are mainly described.

Figure 8:
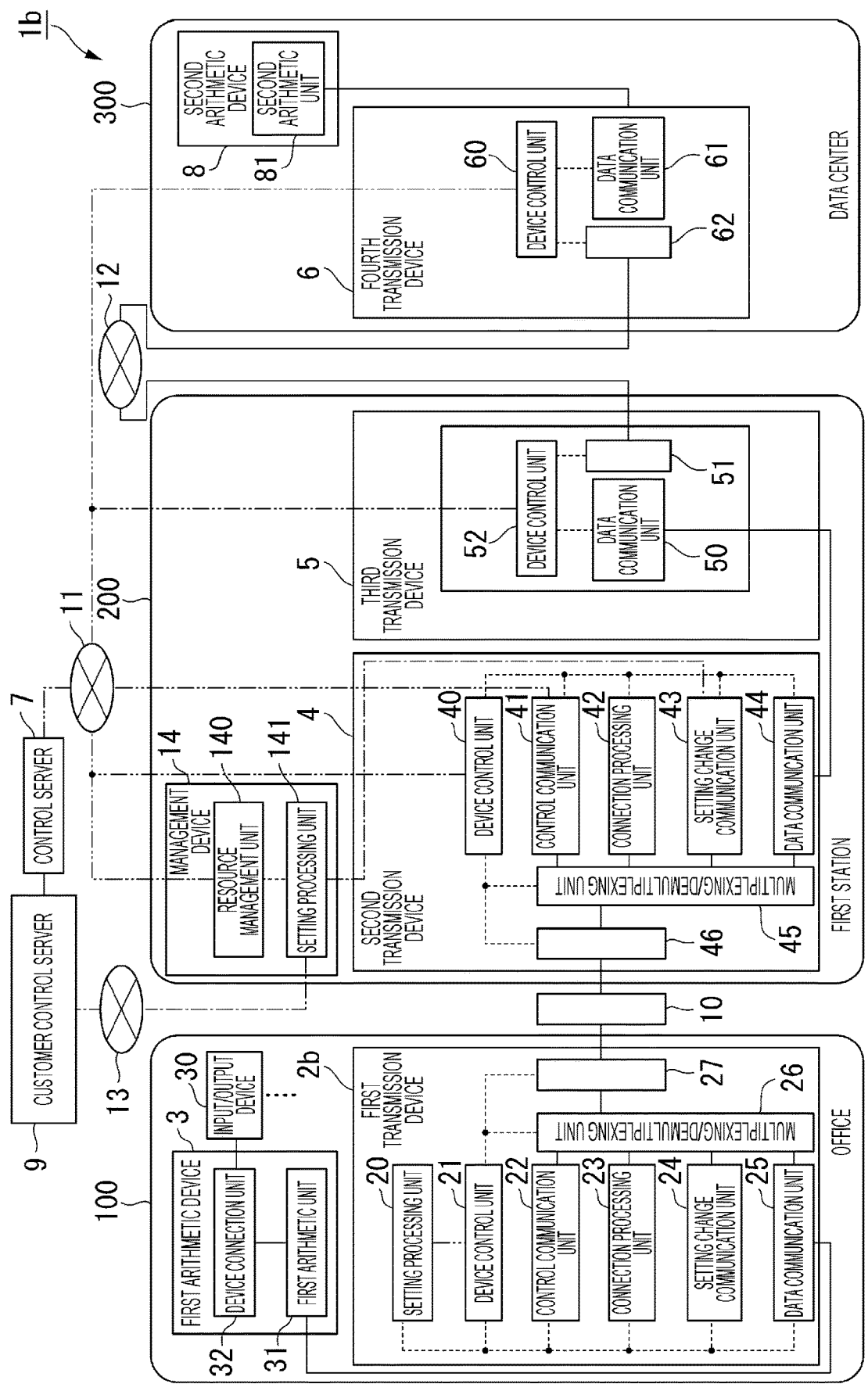
FIG. 8 is a diagram illustrating an example configuration of a communication system in a second embodiment.

FIG. 8 is a diagram illustrating an example configuration of a communication system 1b. The communication system 1b includes a first transmission device 2b, a first arithmetic device 3, a second transmission device 4, a third transmission device 5, a fourth transmission device 6, a control server 7, a second arithmetic device 8, a customer control server 9, an optical transmission line 10, a control network 11, a data network 12, a customer control network 13, and a management device 14.

The first transmission device 2b includes a device control unit 21, a control communication unit 22, a connection processing unit 23, a setting change communication unit 24, a data communication unit 25, a multiplexing/demultiplexing unit 26, and an optical signal communication unit 27.

The data communication unit 25 acquires, from the first arithmetic unit 31, a signal (an instruction from the first arithmetic unit 31) for a setting signal transmitted in a setting change line. The instruction from the first arithmetic unit 31 may be transmitted from the first arithmetic unit 31 to the data communication unit 25 by a logical multiplexing method implemented in existing Ethernet (registered trademark). This logical multiplexing method involves a method for changing connection destinations in accordance with an IP address, and a format of VLAN multiplexing, for example. The setting change communication unit 24 transmits the instruction from the first arithmetic unit 31 to the management device 14, using the setting change line.

Note that, in a case where the data communication unit 25 has the functions of the setting change communication unit 24, the data communication unit 25 and the management device 14 may be connected to each other through a setting change line path from the data communication unit 25. In this case, a signal transmitted from the data communication unit 25 includes both the data transmitted through the data line and the data transmitted through the setting change line. Therefore, setting needs to be conducted in the multiplexing/demultiplexing unit 26 and the multiplexing/demultiplexing unit 45 so that the multiplexing/demultiplexing unit 26 and the multiplexing/demultiplexing unit 45 can distinguish those sets of data from each other. Also, a connection method by which a plurality of setting change line paths is used in combination may be adopted.

The management device 14 (a resource allocation device) includes a resource management unit 140 and a setting processing unit 141. The management device 14 (a relay device) is provided in the first station 200 (a relay station), for example. In this manner, the setting processing unit 141 is provided in the first station 200 as a functional unit that is separate from the first transmission device 2b.

The management device 14 is a device that manages allocation of arithmetic resources. The arithmetic resources mean the computational resources including a central processing unit (CPU), a memory, and a storage. Note that the arithmetic resources may be in either a physical form or a logical form, may be logical resources in a physical server, or may be logical resources formed with a plurality of servers. The arithmetic resources are used in calculation processes related to the setting of the data network 12, for example. The resource management unit 140 performs an arithmetic resource allocation process, on the basis of an arithmetic resource allocation request from the control server 7. The setting processing unit 141 is generated as an arithmetic resource for the first transmission device 2b, and is allocated by the resource management unit 140. The setting processing unit 141 is connected to the setting change communication unit 24 via the setting change communication unit 43. The setting processing unit 141 is also connected to the customer control server 9.

Next, an example operation of the communication system 1b is described.

Figure 9:
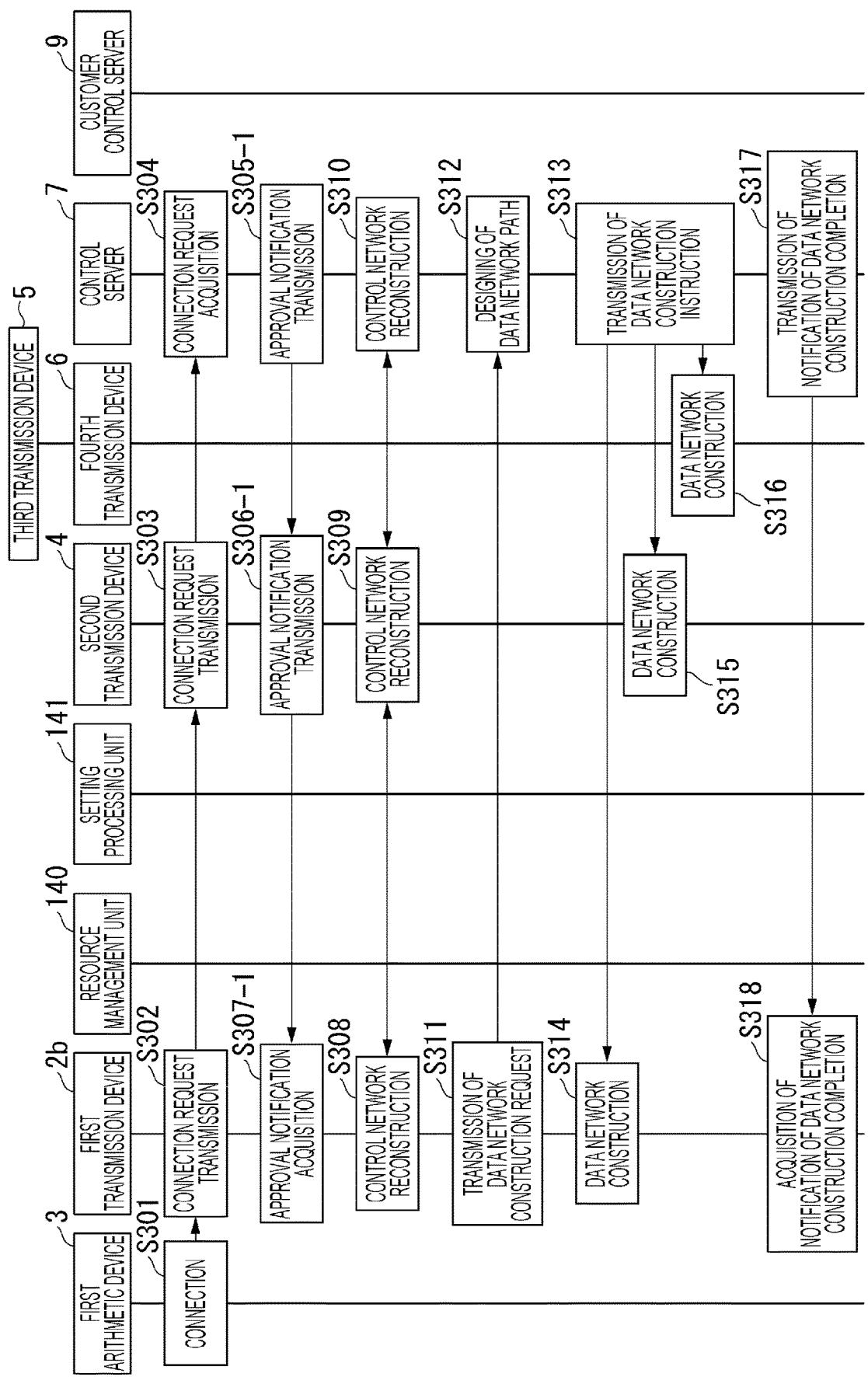
FIG. 9 is a sequence diagram illustrating an example operation of constructing lines of a control network and a data network in the second embodiment.

FIG. 9 is a sequence diagram illustrating an example operation of constructing lines of the control network 11 and the data network 12 (construction of communication paths of a control line and a data line). The respective operations from step S301 to step S318 are the same as the respective operations from step S101 to step S118 illustrated in FIG. 4.

Figure 10:
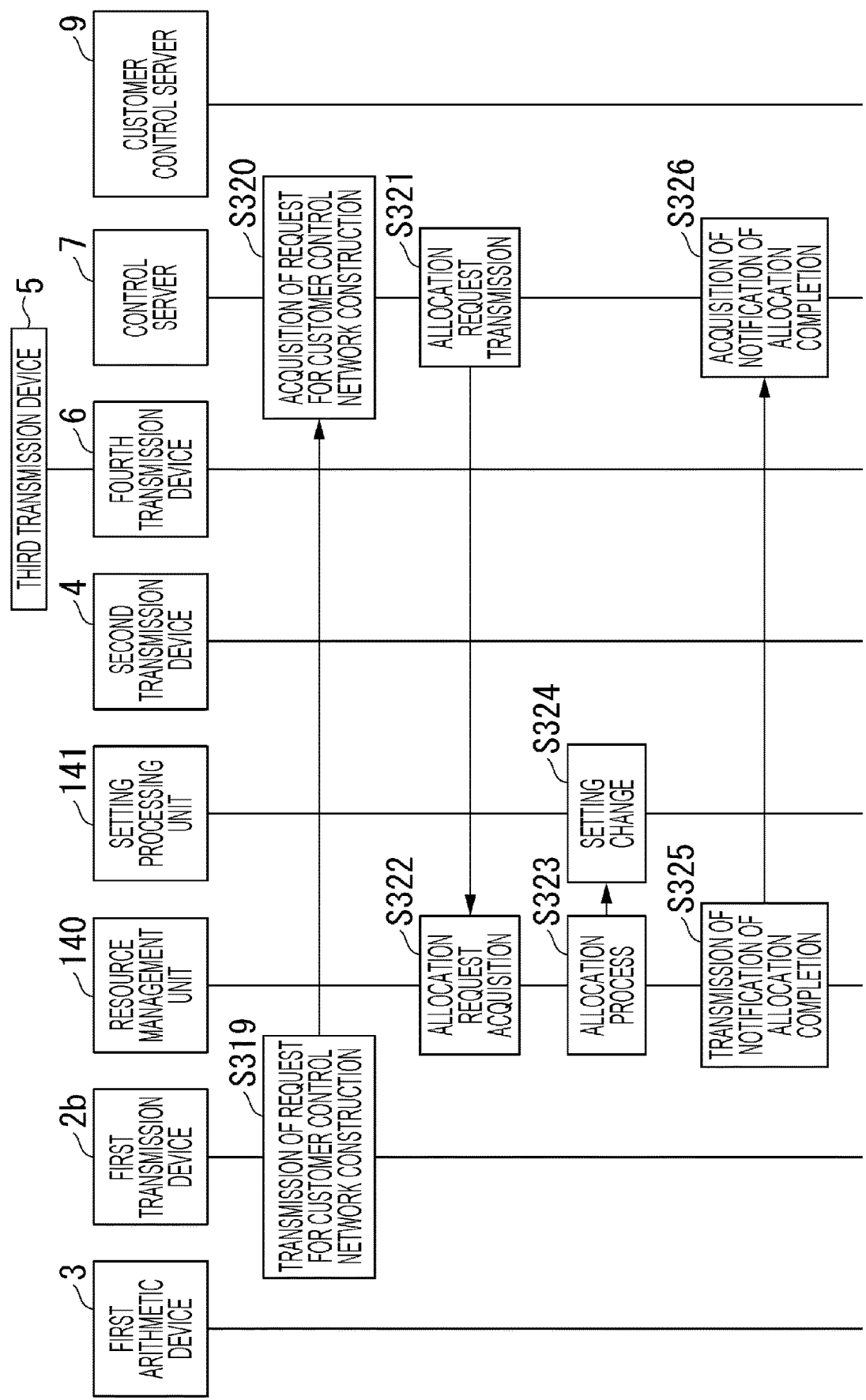
FIG. 10 is a sequence diagram illustrating an example operation of constructing a line of a customer control network in the second embodiment.

FIG. 10 is a sequence diagram illustrating an example operation of constructing a line of the customer control network 13. The respective operations in step S319 and step S320 are the same as the respective operations in step S119 and step S120 illustrated in FIG. 5.

The control server 7 transmits a request for allocation of an arithmetic resource to the first arithmetic device 3 connected to the first transmission device 2b, to the resource management unit 140 (step S321). The resource management unit 140 acquires the arithmetic resource allocation request (step S322).

The resource management unit 140 determines the allocation of the requested arithmetic resource amount among the arithmetic resources being managed by the resource management unit 140, on the basis of the contents of the allocation request (step S323). At this stage, if the arithmetic resource that can be managed and used by the resource management unit 140 is less than the arithmetic resource amount requested to be allocated, the resource management unit 140 notifies the control server 7 of a result indicating that the resource allocation is not possible. In this manner, the resource management unit 140 may eliminate the step of constructing the customer control network 13.

The setting processing unit 141 is generated as the arithmetic resource allocated by the resource management unit 140. The setting processing unit 141 may be a process that is performed in an operating system. The setting processing unit 141 may be a process or a program that is executed in a container generated by "Docker". The setting processing unit 141 may be a program or a process that is performed in a virtual machine. The setting processing unit 141 may be a process execution environment of a virtual machine, or may be dynamically generated in a processor and a memory through execution of installation. In a case where the execution environment in which the process is performed is prepared beforehand, the setting processing unit 141 may be allocated to the processor and the memory in response to a setting change or a process start instruction. The setting processing unit 141 generated in response to the allocation by the resource management unit 140 receives setting information, and changes the setting of the setting processing unit 141 so that communication with the control server becomes possible (step S324). Note that, in a case where an allocation process including the contents executed in step S324 is performed when the resource management unit 140 generates the setting processing unit 141, the execution of step S324 may be skipped. The resource management unit 140 transmits a notification of completion of the arithmetic resource allocation, to the control server 7 (step S326).

Figure 11:
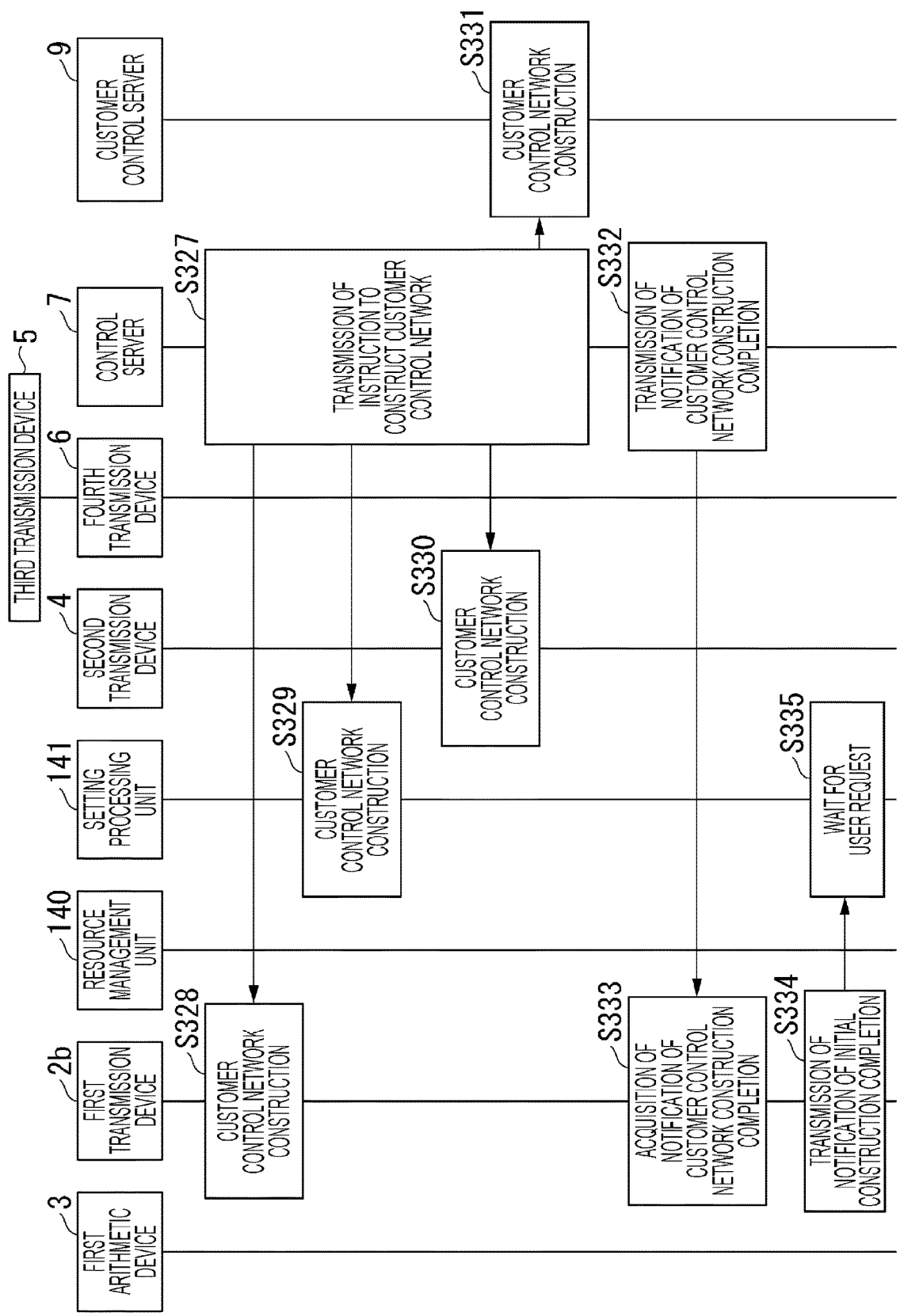
FIG. 11 is a sequence diagram illustrating an example operation of constructing a line of the customer control network in the second embodiment.

FIG. 11 is a sequence diagram illustrating an example operation of constructing a line of the customer control network 13. The control server 7 transmits an instruction to construct a customer control network to the first transmission device 2b, the setting processing unit 141, the second transmission device 4, and the customer control server 9 (step S327), like the instruction to construct the control network 11 in step S110.

On the basis of the instruction to construct a customer control network, the device control unit 21 of the first transmission device 2b changes the setting of the multiplexing/demultiplexing unit 26 (step S328). The setting processing unit 141 constructs the customer control network 13 (step S329). On the basis of the instruction to construct a customer control network, the device control unit 40 of the second transmission device 4 changes the setting of the multiplexing/demultiplexing unit 45 (step S330).

On the basis of the instruction from the control server 7, the customer control server 9 changes the setting of the customer control server 9 so as to enable communication between the first transmission device 2b and the customer control server 9 via the customer control network 13 (step S331). Through the setting changes made in these steps, a connection between the first transmission device 2b and the customer control server 9 is established via the setting change line and the customer control network 13. Note that communication between the first transmission device 2b and the customer control server 9 may be conducted via the control communication unit 41. In that case, the control line is connected to the control communication unit 41 via the multiplexing/demultiplexing unit 45.

The control server 7 transmits a notification of completion of the customer control network construction to the first transmission device 2b (step S332). The first transmission device 2b acquires the notification of completion of the customer control network construction (step S333). The first transmission device 2b transmits the notification of completion of the initial construction to the setting processing unit 141 (step S334). The setting processing unit 141 waits for acquisition of a user request (a request to change data, for example) (step S335).

Figure 12:
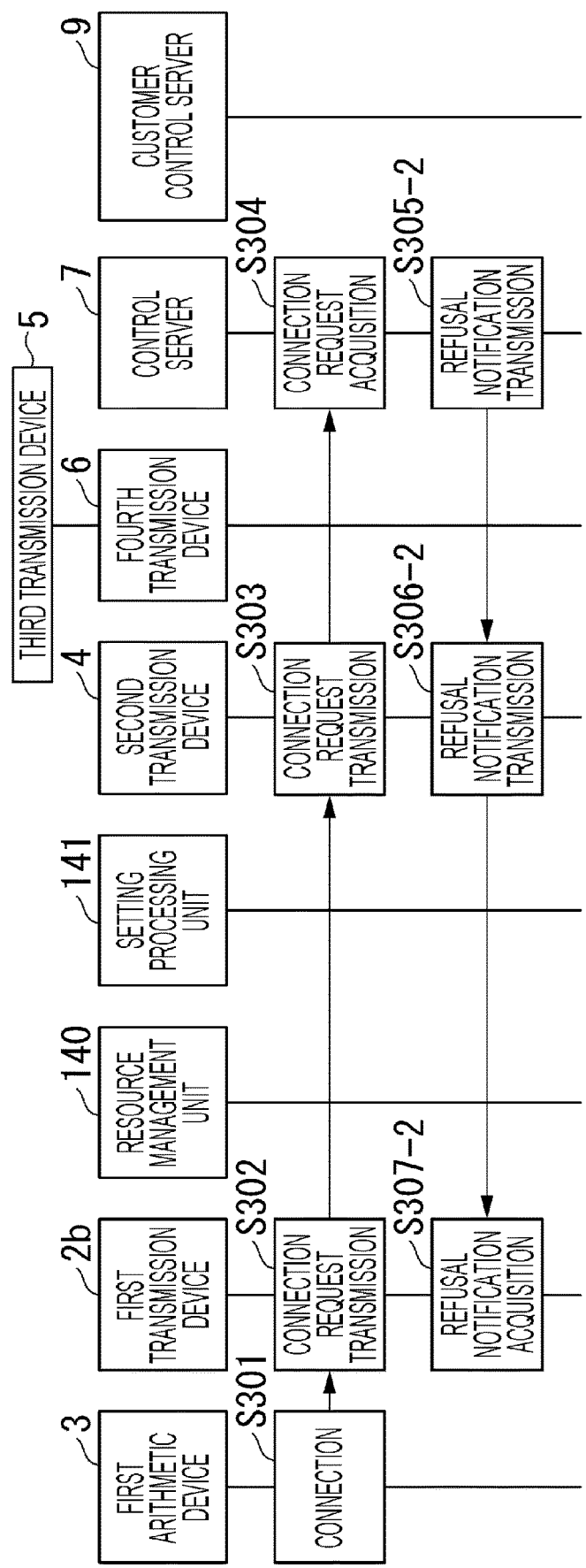
FIG. 12 is a sequence diagram illustrating an example connection refusal operation in the second embodiment.

FIG. 12 is a sequence diagram illustrating an example operation of refusing a connection. The respective operations from step S301 to step S307-2 are the same as the respective operations from step S101 to step S107-2 illustrated in FIG. 6.

Figure 13:
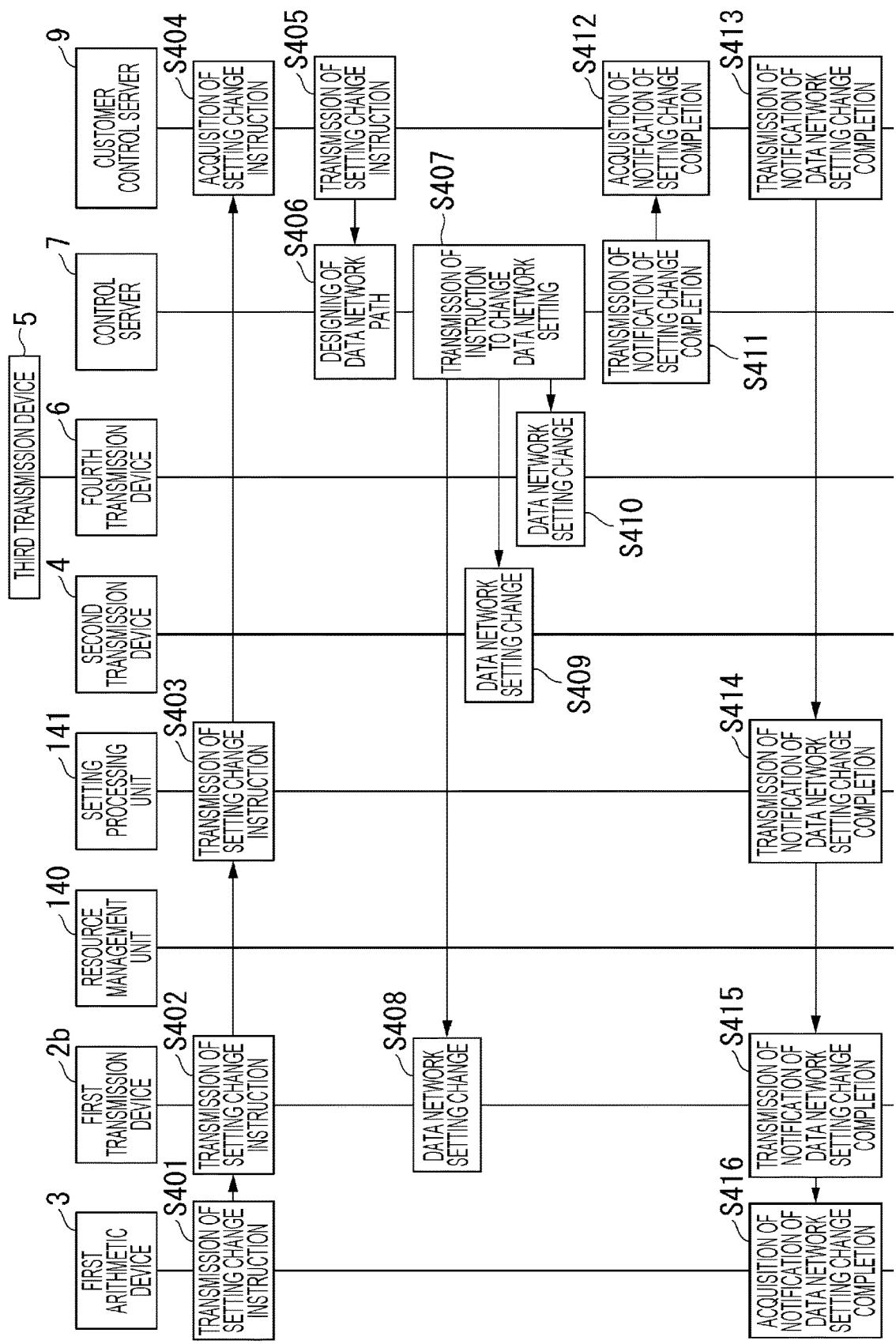
FIG. 13 is a sequence diagram illustrating an example operation of changing the setting of the data network in the second embodiment.

FIG. 13 is a sequence diagram illustrating an example operation of changing the setting of the data network 12. The first arithmetic device 3 transmits an instruction to change the setting of the data network, to the first transmission device 2b (step S401). The first transmission device 2b transmits the instruction to change the setting of the data network, to the setting processing unit 141 via the setting change line (step S402). The setting processing unit 141 transmits an instruction to change the setting of the data network, to the customer control server 9 (step S403). The customer control server 9 acquires the setting change instruction (step S404).

The respective operations from step S405 to step S412 are the same as the respective operations from step S204 to step S221 illustrated in FIG. 7. Note that the instruction to change the setting of the data network 12 is executed for devices that need changing the setting, as in FIG. 7. In this case, the instruction is transmitted to the first transmission device 2b, the second transmission device 4, the third transmission device 5, and the fourth transmission device 6.

The customer control server 9 transmits a notification of completion of the setting change in the data network, to the setting processing unit 141 (step S413). The setting processing unit 141 transmits the notification of completion of the setting change in the data network, to the first transmission device 2b (step S414). The first transmission device 2b transmits the notification of completion of the setting change in the data network, to the first arithmetic device 3 (step S415). The first arithmetic device 3 acquires the notification of completion of the setting change in the data network (step S416).

As described above, the setting processing unit 141 is provided in the first station 200 as a functional unit that is separate from the first transmission device 2b. When the user simply connects the first transmission device 2b to the optical transmission line 10 (a physical line such as an optical fiber) in a physical manner, three kinds of communication networks, which are the control line of the control network 11, the data line of the data network 12, and the setting change line of the customer control network 13, are automatically constructed between the office 100 and the first station 200.

With this arrangement, the user can quickly use and change communication services. The user's setting instruction generated by a transmission device at an end of the network reaches the customer control server 9 without passing through any external network. Thus, the data of a transmission device in the network can be changed by the user. Because of these aspects, the security of the setting processing unit can be increased.

Third Embodiment

A third embodiment differs from the second embodiment in that a setting processing unit is provided in a place (the customer control server 9, for example) other than the first station 200. In the third embodiment, the differences from the second embodiment are mainly described.

Figure 14:
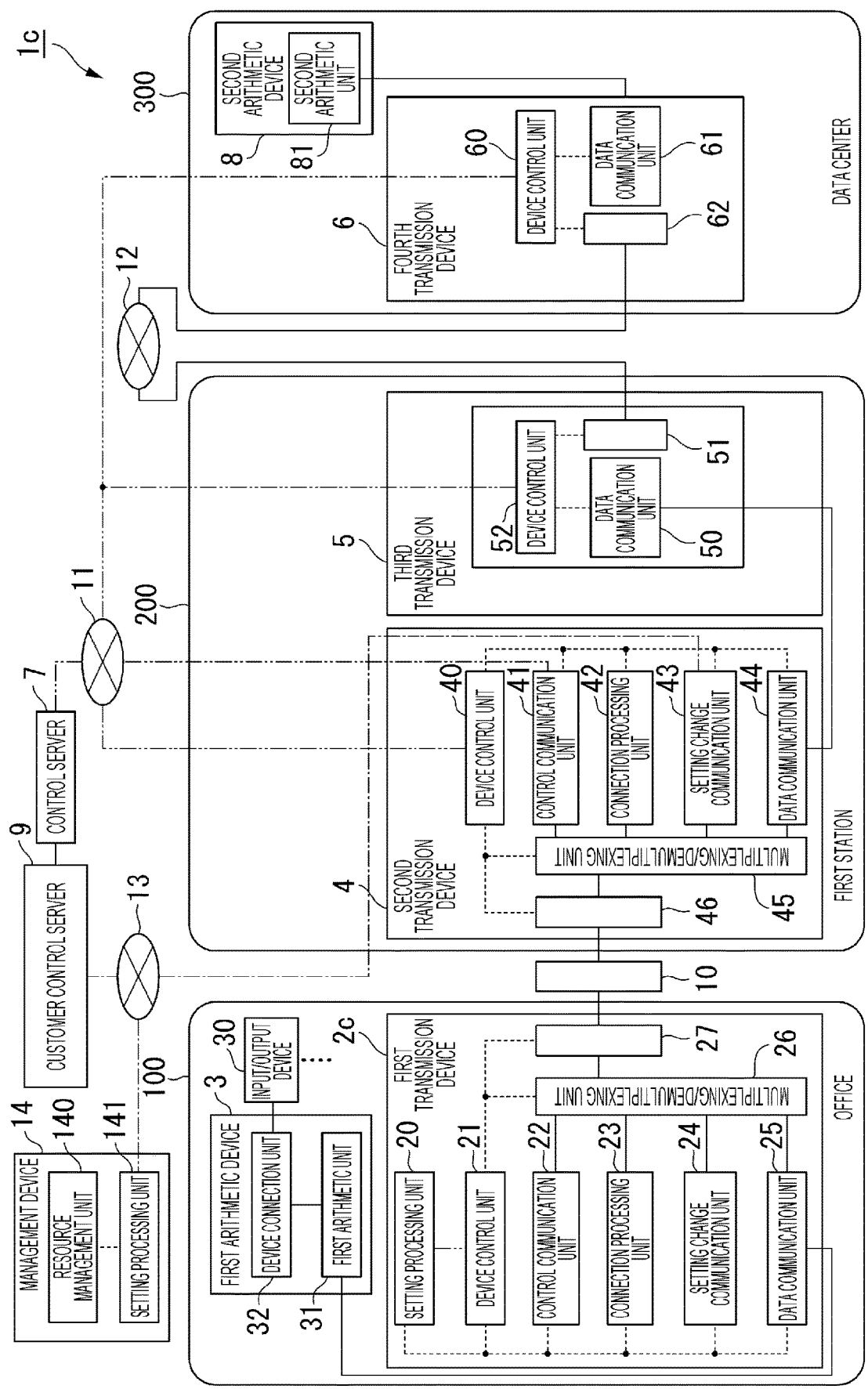
FIG. 14 is a diagram illustrating an example configuration of a communication system in a third embodiment.

FIG. 14 is a diagram illustrating an example configuration of a communication system 1c. The communication system 1c includes a first transmission device 2c, a first arithmetic device 3, a second transmission device 4, a third transmission device 5, a fourth transmission device 6, a control server 7, a second arithmetic device 8, a customer control server 9, an optical transmission line 10, a control network 11, a data network 12, a customer control network 13, and a management device 14.

The management device 14 is provided in a facility where the customer control server 9 is installed (a predetermined station, for example). The management device 14 may be provided in a facility (the customer control server 9, for example) determined beforehand as an arithmetic resource of the communications company. In this manner, the setting processing unit 141 is provided as a functional unit separate from the first transmission device 2d in a facility where the customer control server 9 is installed or in the customer control server 9.

The setting processing unit 141 communicates with the first arithmetic unit 31 via the customer control network 13, the setting change communication unit 43, the setting change line, and the setting change communication unit 24. The first arithmetic unit 31 transmits an instruction to change the setting of the data network, to the customer control server 9 via the setting change communication unit 24, the setting change line, the setting change communication unit 43, and the customer control network 13.

As described above, the setting processing unit 141 is provided as a functional unit separate from the first transmission device 2c in a facility where the customer control server 9 is installed (a facility of the communications company, for example) or in the customer control server 9. When the user simply connects the first transmission device 2c to the optical transmission line 10 in a physical manner as above, three kinds of communication networks, which are the control line of the control network 11, the data line of the data network 12, and the setting change line of the customer control network 13, are automatically constructed between the office 100 and the first station 200.

With this arrangement, the user can quickly use and change communication services. The user's setting instruction generated by a transmission device (the first transmission device) at an end of the network reaches the customer control server 9 without passing through any external network. Thus, the user can change the data of a transmission device in the network. The security of the setting processing unit can also be increased.

Fourth Embodiment

A fourth embodiment differs from the second embodiment in that only the input/output device 30 prepared by the user is connected to the first transmission device. In the fourth embodiment, the differences from the second embodiment are mainly described.

Figure 15:
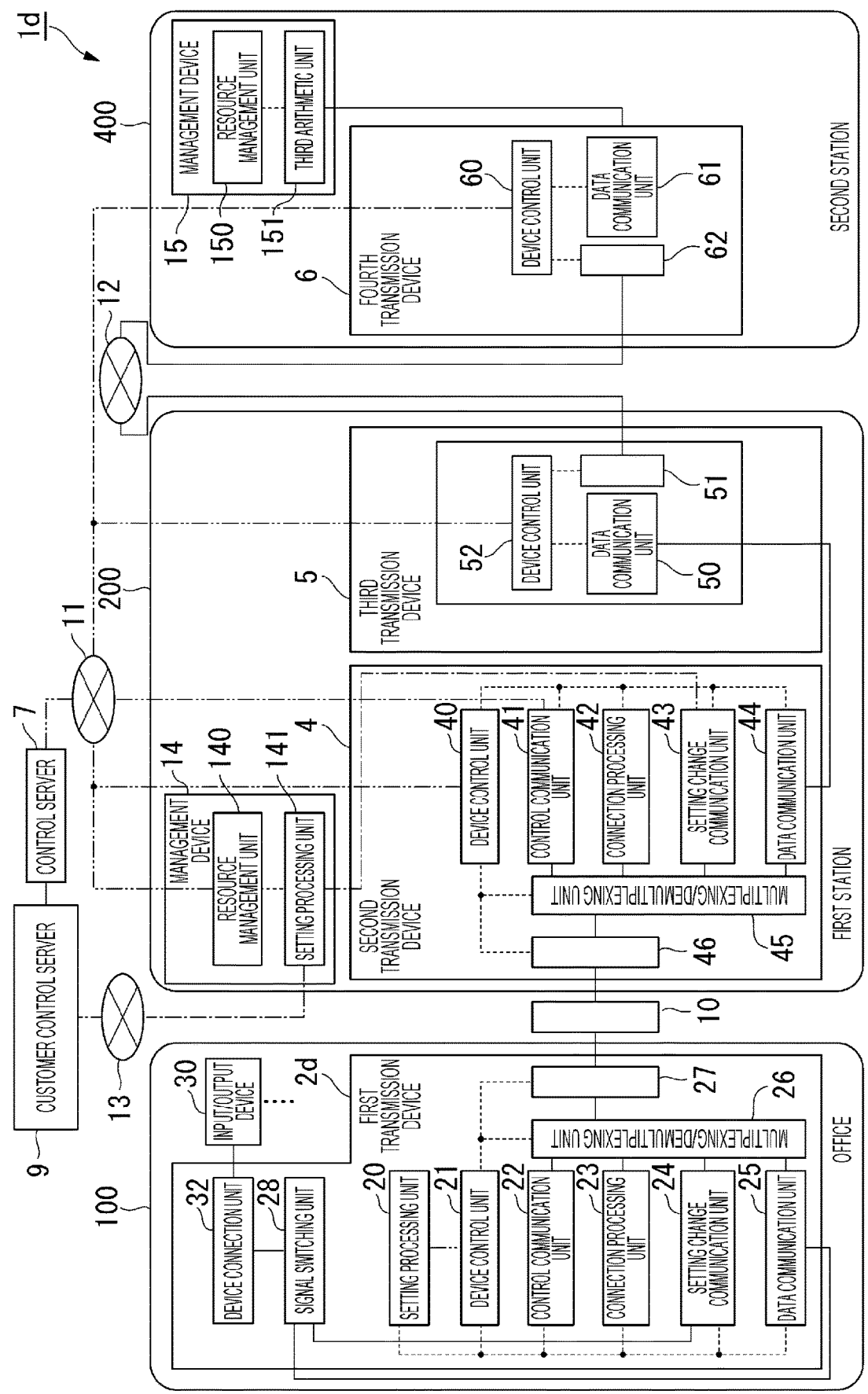
FIG. 15 is a diagram illustrating an example configuration of a communication system in a fourth embodiment.

FIG. 15 is a diagram illustrating an example configuration of a communication system 1d. The communication system 1d includes a first transmission device 2d, a second transmission device 4, a third transmission device 5, a fourth transmission device 6, a control server 7, a customer control server 9, an optical transmission line 10, a control network 11, a data network 12, a customer control network 13, a management device 14, a management device 15, and an input/output device 30.

The first transmission device 2d includes a device control unit 21, a control communication unit 22, a connection processing unit 23, a setting change communication unit 24, a data communication unit 25, a multiplexing/demultiplexing unit 26, an optical signal communication unit 27, a signal switching unit 28, and a device connection unit 32.

The management device 15 (an information processing device) includes a resource management unit 150 and a third arithmetic unit 151. The fourth transmission device 6 and the management device 15 (a relay device) are provided in a second station 400 (a relay station), for example.

The input/output device 30 is connected to the device connection unit 32 by the user. Communication in a case where the third arithmetic unit 151 is operated is now described. The input/output device 30 transmits data (operation data) corresponding to an operation received by the input/output device 30, to the device connection unit 32 in the uplink direction.

The signal switching unit 28 distributes operation data for each input/output device 30, for example, to the data communication unit 25. The data communication unit 25 transmits the operation data to the third arithmetic unit 151. The data communication unit 25 receives data from the third arithmetic unit 151. The data communication unit 25 transmits the data from the third arithmetic unit 151, to the device connection unit 32. The device connection unit 32 transmits the data to the input/output device 30.

Note that, in a case where a plurality of input/output devices 30 is connected to the device connection unit 32, data compatible with each of the input/output devices 30 is transmitted and received. For example, in a case where a monitor is connected, video signals of "High-Definition Multimedia Interface (HDMI) (registered trademark)", "DisplayPort", "D-sub", "Digital Visual Interface (DVI)", "Universal Serial Bus (USB) type-C", or the like are bidirectionally exchanged. In a case where a USB device such as a mouse, a keyboard, a camera, a speaker, or a sensor is connected, USB signals, audio signals, and the like are bidirectionally exchanged. Note that these signal types are not limited to the above, and signals and a device other than the above may be connected to the first transmission device 2d, as long as the first transmission device 2d can transmit and receive the generally known device and signals with the device.

Communication in a case where the input/output device 30 is operated is now described. The input/output device 30 transmits data (operation data) corresponding to an operation received by the input/output device 30, to the device connection unit 32 in the uplink direction. The signal switching unit 28 distributes operation data for each input/output device 30, for example, to the data communication unit 25.

The setting change communication unit 24 transmits the operation data to the setting processing unit 141. The setting change communication unit 24 receives data from the setting processing unit 141. The setting change communication unit 24 transmits the data from the setting processing unit 141, to the device connection unit 32 via the signal switching unit 28. The device connection unit 32 transmits the data to the input/output device 30. The data to be exchanged between the input/output device 30 and the setting processing unit 141, and the data to be exchanged between the input/output device 30 and the third arithmetic unit 151 may be compatible with the same signal type.

The distribution at the multiplexing/demultiplexing unit 26 may be performed so that a connection to the setting change communication unit 24 and a connection to the data communication unit 25 are switched by a specific signal from the input/output device 30 operated by the user. The specific signal is formed with simultaneous inputs from specific keys on a keyboard, for example. Further, the switching of allocation may be performed with a physical switch provided on the first transmission device 2d.

The device connection unit 32 may convert a signal being exchanged between the input/output device 30 and the device connection unit 32 into another signal. The converted signal may be transmitted to 20 and the data communication unit 25 via the multiplexing/demultiplexing unit 26. As a reverse flow, a signal from 20 and the data communication unit 25 may be converted into a signal for the input/output device 30, and be transmitted to the input/output device 30. Another signal is a signal of Ethernet (registered trademark) that is used in a KVM extender or the like, for example.

A signal transmitted from the data communication unit 25 may be converted into another signal by the second transmission device 4 or the fourth transmission device 6. The setting processing unit 141 and the third arithmetic unit 151 may receive the converted signal. As a reverse flow, the second transmission device 4 or the fourth transmission device 6 may convert signals transmitted from the setting processing unit 141 and the third arithmetic unit 151 into signals for the data communication unit 25 of the first transmission device 2d, and then transmit the signals. Note that signals between a transmission device, a processing unit, and an arithmetic unit are Ethernet (registered trademark) signals, for example. Alternatively, the signals may be of the same type as the signals being exchanged between the input/output device 30 and the device connection unit 32, as long as the signals are compatible with the setting processing unit 141 and the third arithmetic unit 151. In that case, the type of "another signal" is the same as the type of those signals.

Figure 16:
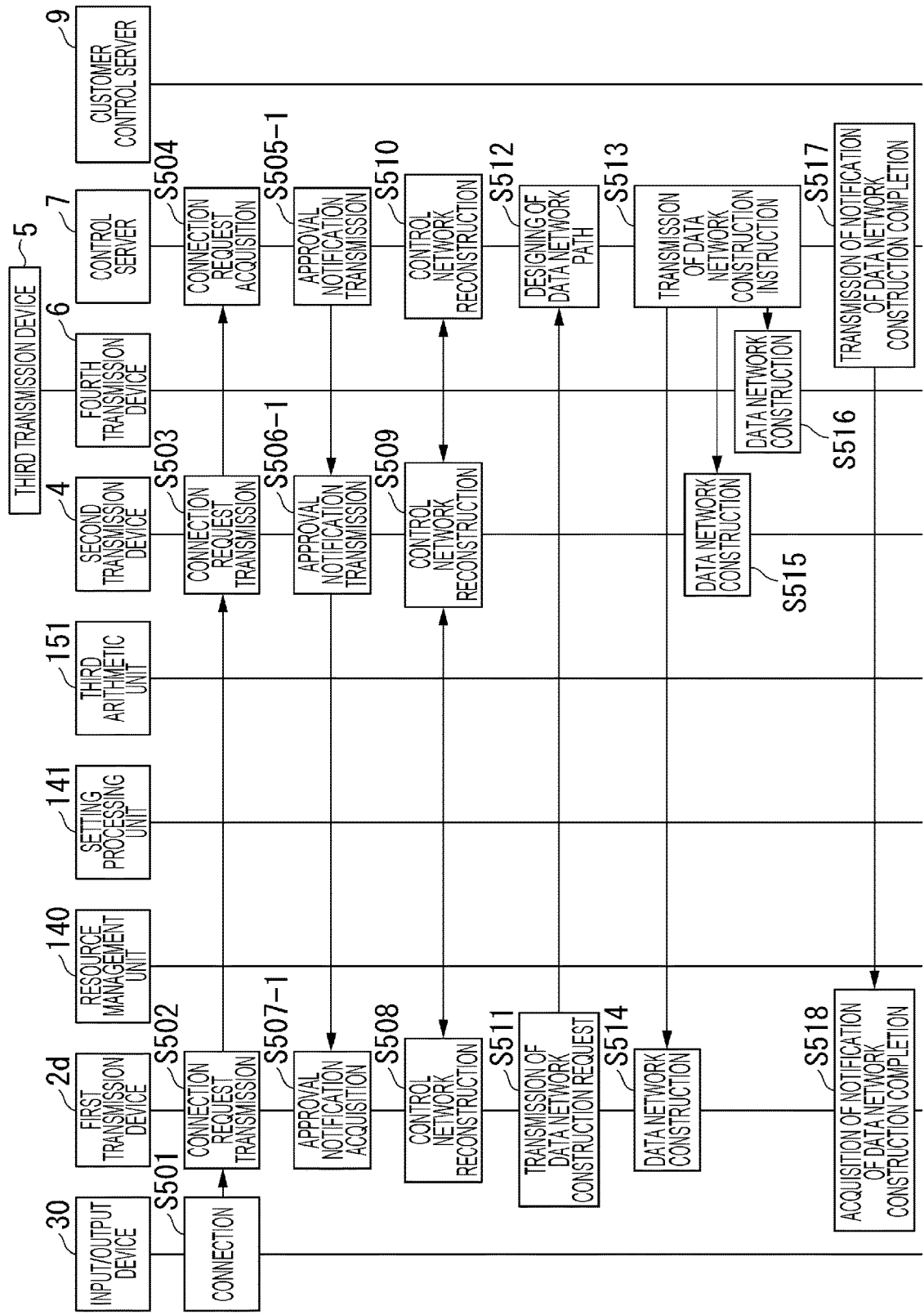
FIG. 16 is a sequence diagram illustrating an example operation of constructing lines of a control network and a data network in the fourth embodiment.

FIG. 16 is a sequence diagram illustrating an example operation of constructing lines of the control network 11 and the data network 12. The respective operations from step S501 to step S518 are the same as the respective operations from step S101 to step S118 illustrated in FIG. 4.

Figure 17:
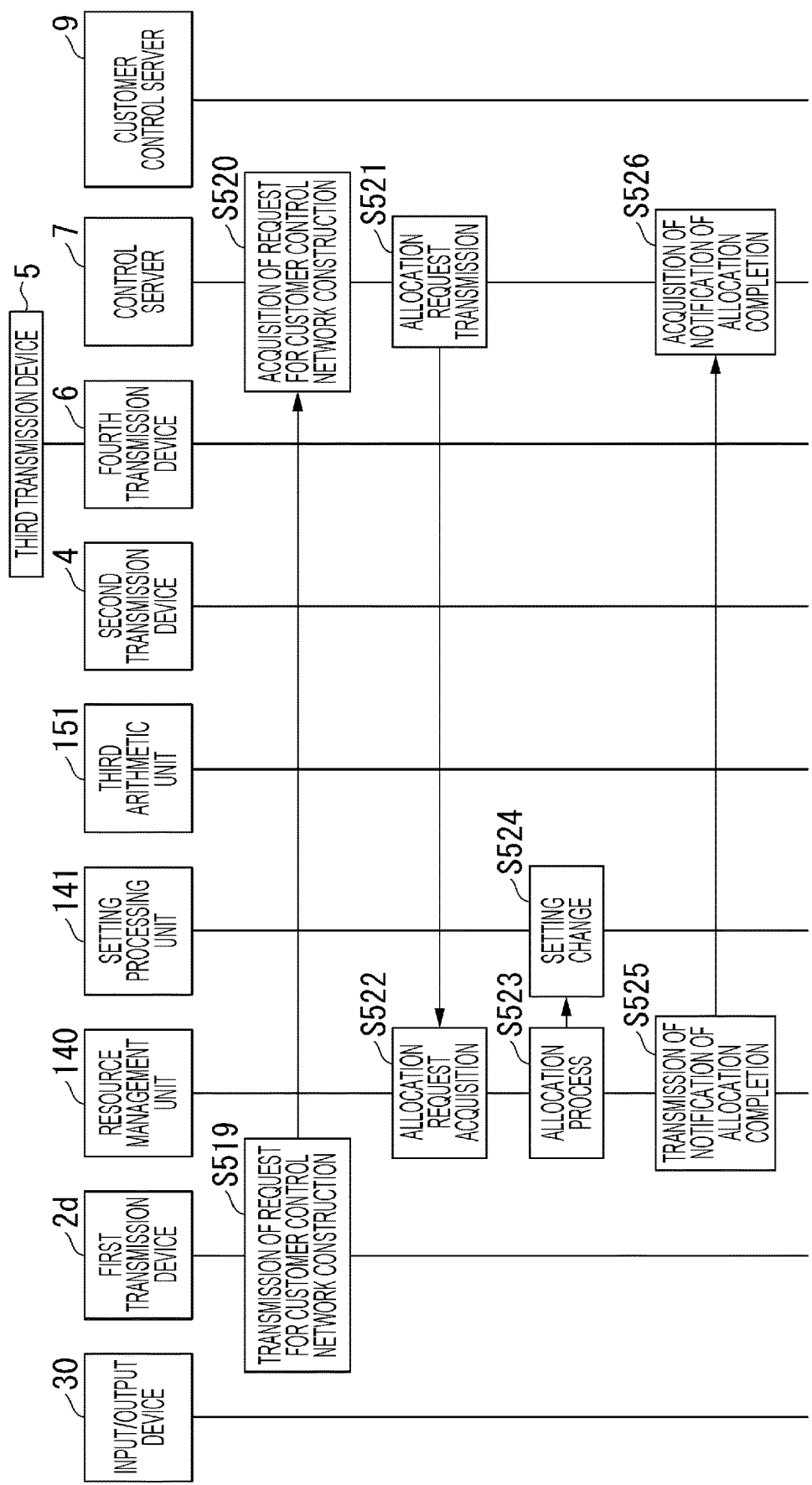
FIG. 17 is a sequence diagram illustrating an example operation of constructing a line of a customer control network in the fourth embodiment.

FIG. 17 is a sequence diagram illustrating an example operation of constructing a line of the customer control network 13. The respective operations from step S519 to step S526 are the same as the respective operations from step S319 to step S326 illustrated in FIG. 10.

Since there are no arithmetic units in the office 100, the setting processing unit 141 allocated as an arithmetic resource has functions corresponding to an arithmetic unit (corresponding to an operating system running in a virtual machine, for example). The setting processing unit 141 may also have a function for operating a driver compatible with each signal such as a video signal, a USB signal, and an audio signal. These signals may be transmitted and received directly by the second transmission device 4 and the first transmission device 2d, or may be converted into another signal such as Ethernet (registered trademark) signals and be transmitted and received by the second transmission device 4 and the first transmission device 2d.

Figure 18:
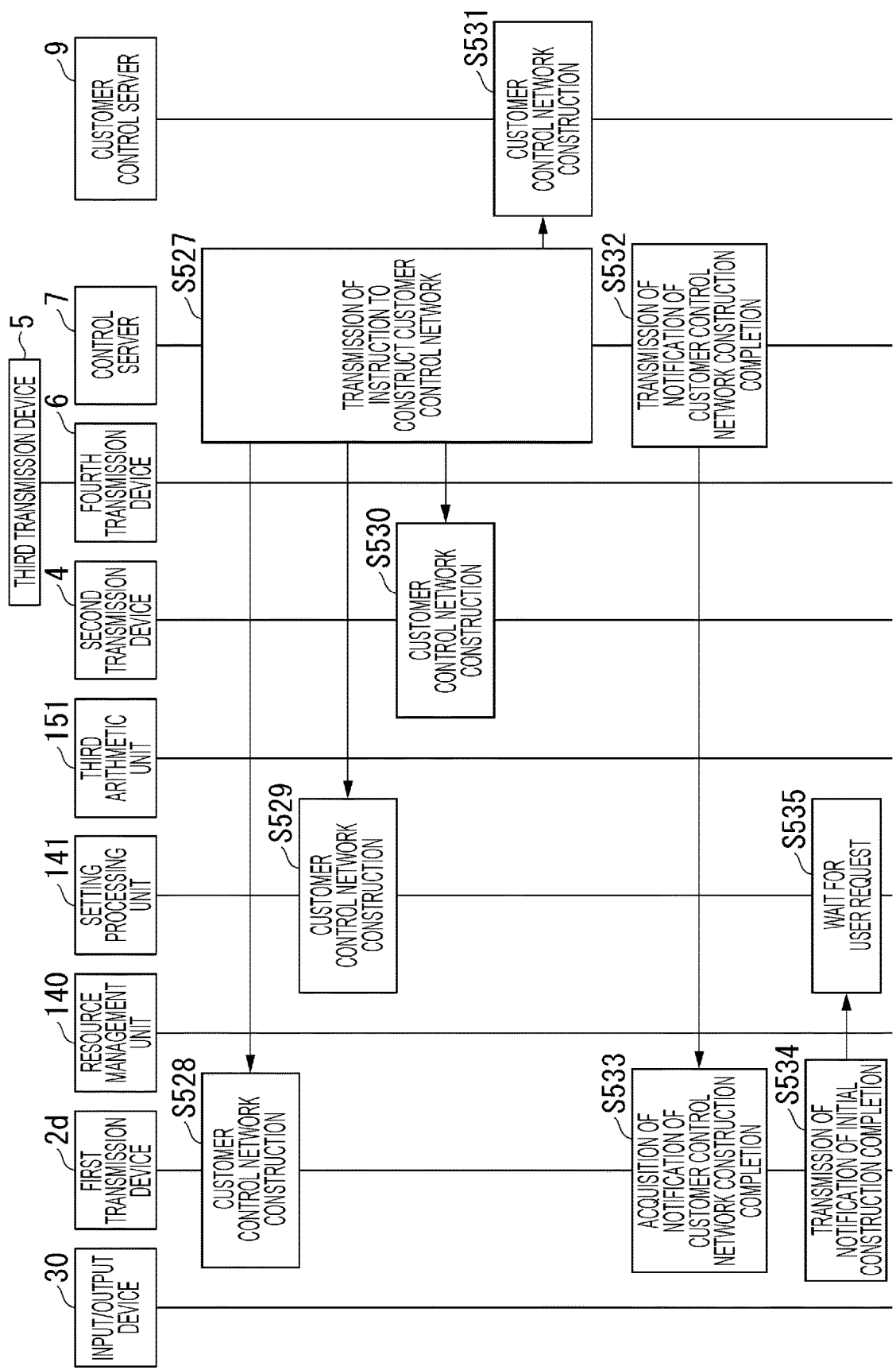
FIG. 18 is a sequence diagram illustrating an example operation of constructing a line of the customer control network in the fourth embodiment.

FIG. 18 is a sequence diagram illustrating an example operation of constructing a line of the customer control network 13. The respective operations from step S527 to step S535 are the same as the respective operations from step S327 to step S335 illustrated in FIG. 11.

Figure 19:
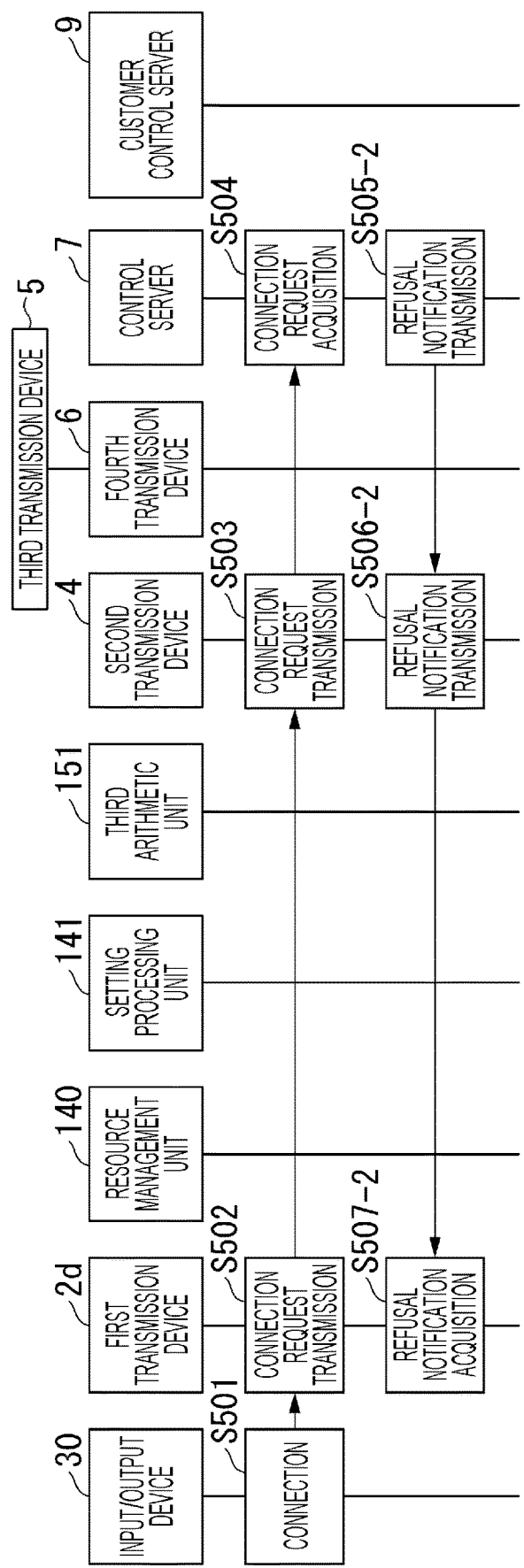
FIG. 19 is a sequence diagram illustrating an example connection refusal operation in the fourth embodiment.

FIG. 19 is a sequence diagram illustrating an example operation of refusing a connection. The respective operations from step S501 to step S507-2 are the same as the respective operations from step S101 to step S107-2 illustrated in FIG. 6.

Figure 20:
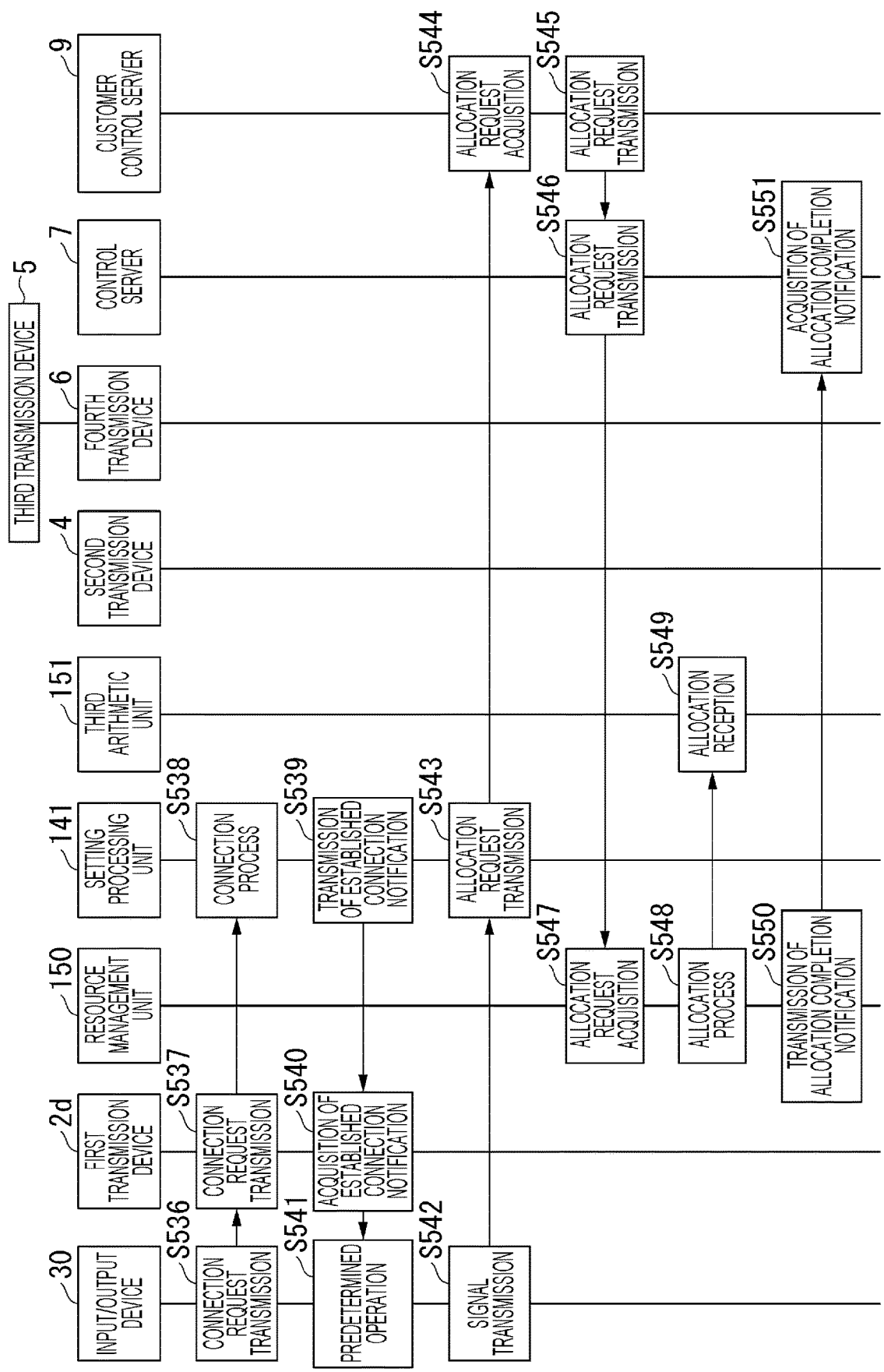
FIG. 20 is a sequence diagram illustrating an example operation to be performed when an arithmetic resource is allocated as an arithmetic device that is normally used by the user of an input/output device in the fourth embodiment.

FIG. 20 is a sequence diagram illustrating an example operation to be performed when an arithmetic resource is allocated as an arithmetic device that is normally used by the user of the input/output device 30. In response to an operation by the user, the input/output device 30 transmits a request for a connection between the input/output device 30 and the setting processing unit 141, to the first transmission device 2d (step S536). This connection request may be a connection request that is made by an input through a specific single key on a keyboard or simultaneous inputs through a plurality of key on the keyboard, for example. The first transmission device 2d transmits the connection request to the setting processing unit 141 via the setting change line (step S537). On the basis of the connection request, the setting processing unit 141 performs a process (a connection process) of establishing a connection between the input/output device 30 and the setting processing unit 141 (step S538).

The setting processing unit 141 transmits the data (a video signal and an audio signal, for example) necessary for the input/output device 30, to the first transmission device 2d (step S539). At this stage, notification information about the established connection between the setting processing unit 141 and the first transmission device 2d may be included in the data. The first transmission device 2d transmits the received data to the corresponding input/output device 30

(the video signal being transmitted to the monitor, the audio signal being transmitted to the speaker, for example) (step S540). The input/output device 30 performs a predetermined operation, in accordance with the data transmitted from the first transmission device 2d (step S541). Note that after the connection between the input/output device 30 and the setting processing unit 141 is established, communication may be performed with each other. Further, a signal being communicated may be converted into another signal such as an Ethernet (registered trademark) signal.

In the subsequent process, a signal from a keyboard, a mouse, or the like is sent to the setting processing unit 141 by the user referring to screen information or the like displayed on the input/output device 30, so that the setting processing unit 141 is remotely operated in a situation similar to the operation environment in the office, at a geographically separated place (step S542). Note that the reason for being "similar to the operation environment" is that the operation environment is affected by the communication state (delayed or the like) due to the physical distance between the office 100 and the first station 200. The user operates the input/output device 30, to transmit a request for allocation of the arithmetic resource for the arithmetic device the user normally uses, to the customer control server 9 via the setting processing unit 141. At this stage, the setting processing unit 141 may be able to operate the customer control server 9 in a form such as a browser screen. The setting processing unit 141 and the customer control server 9 may be connected when a specific program is activated.

The setting processing unit 141 transmits, to the customer control server 9, a request for allocation of the arithmetic resource for the arithmetic device the user normally uses (step S543). The customer control server 9 acquires the arithmetic resource allocation request (step S544). The customer control server 9 transmits the arithmetic resource allocation request to the control server 7 (step S545). The control server 7 determines a management device to which the arithmetic resource based on the request can be allocated. Prior to the determination, the control server 7 may check the resource usage status with each management device. Also, the control server 7 may store the resource usage status of each management device as data, and determine the management device on the basis of the stored data.

The control server 7 transmits the request for allocation of the arithmetic resource for the arithmetic device the user normally uses, to the resource management unit 150 of the determined management device 15 (step S546). The resource management unit 150 acquires the arithmetic resource allocation request (step S547). The resource management unit 150 performs a process of allocating the arithmetic resource for the arithmetic device the user normally uses (step S548). The third arithmetic unit 151 receives the request for allocation of the arithmetic resource for the arithmetic device the user normally uses (step S549). The resource management unit 150 transmits a notification of completion of the arithmetic resource allocation, to the control server 7 (step S550). The resource management unit 150 acquires the notification of completion of the arithmetic resource allocation (step S551).

Figure 21:
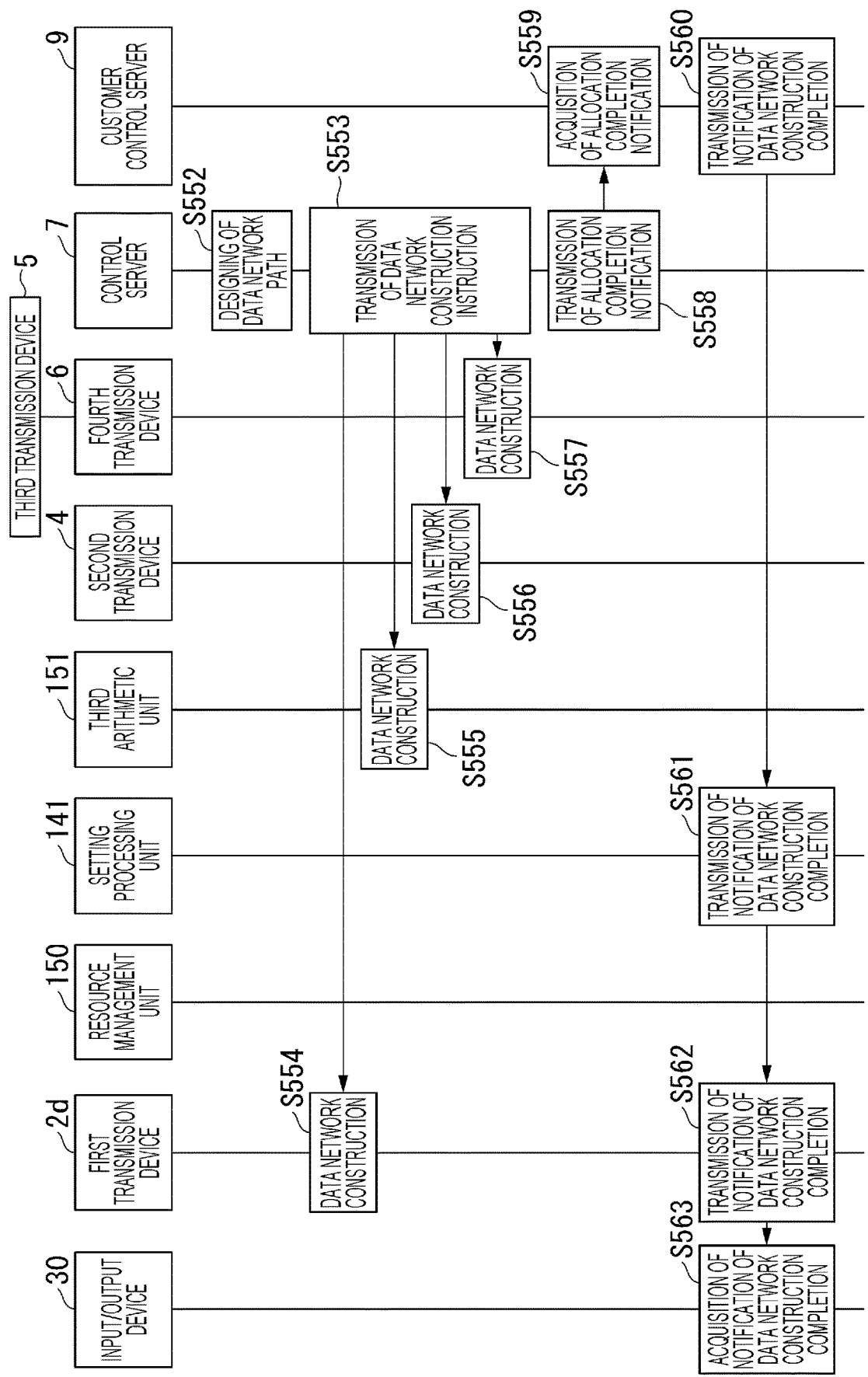
FIG. 21 is a sequence diagram illustrating an example operation of constructing a data network line in the fourth embodiment.

FIG. 21 is a sequence diagram illustrating an example operation of constructing a line between the first transmission device 2d and the third arithmetic unit 151. The control server 7 designs the communication path necessary between the first transmission device 2d and the third arithmetic unit 151 (step S552). On the basis of a result of the designing of the communication path, the control server 7 transmits an instruction to change the setting of the data network 12, to the devices that need changing the setting (the first transmission device 2d, the third arithmetic unit 151, the second transmission device 4, and the fourth transmission device 6 in this example) (step S553).

On the basis of the instruction to change the setting of the data network, the first transmission device 2d changes the setting (the communication speed or the modulation method, for example) of the multiplexing/demultiplexing unit 26 and the data communication unit 25 (a data line) (step S554). The third arithmetic unit 151 changes the setting of the third arithmetic unit 151 so as to connect to the fourth transmission device 6 (step S555). The second transmission device 4 changes the setting of the second transmission device 4 so as to be capable of relaying signals between the data network 12 and the first transmission device 2d (step S556). The third transmission device 5 and the fourth transmission device 6 change the settings of the third transmission device 5 and the fourth transmission device 6 so as to enable connection between a signal from the third arithmetic unit 151 and the data network 12 (step S557). The control server 7 transmits a notification of completion of the setting change in the data network 12, to the customer control server 9 (step S558). The customer control server 9 acquires the notification of completion of the setting change in the data network 12 (step S559).

The customer control server 9 transmits a notification of completion of the construction of the data network 12, to the setting processing unit 141 (step S560). The user receives the notification to the setting processing unit 141 via the input/output device 30 (steps S561 to S563).

Figure 22:
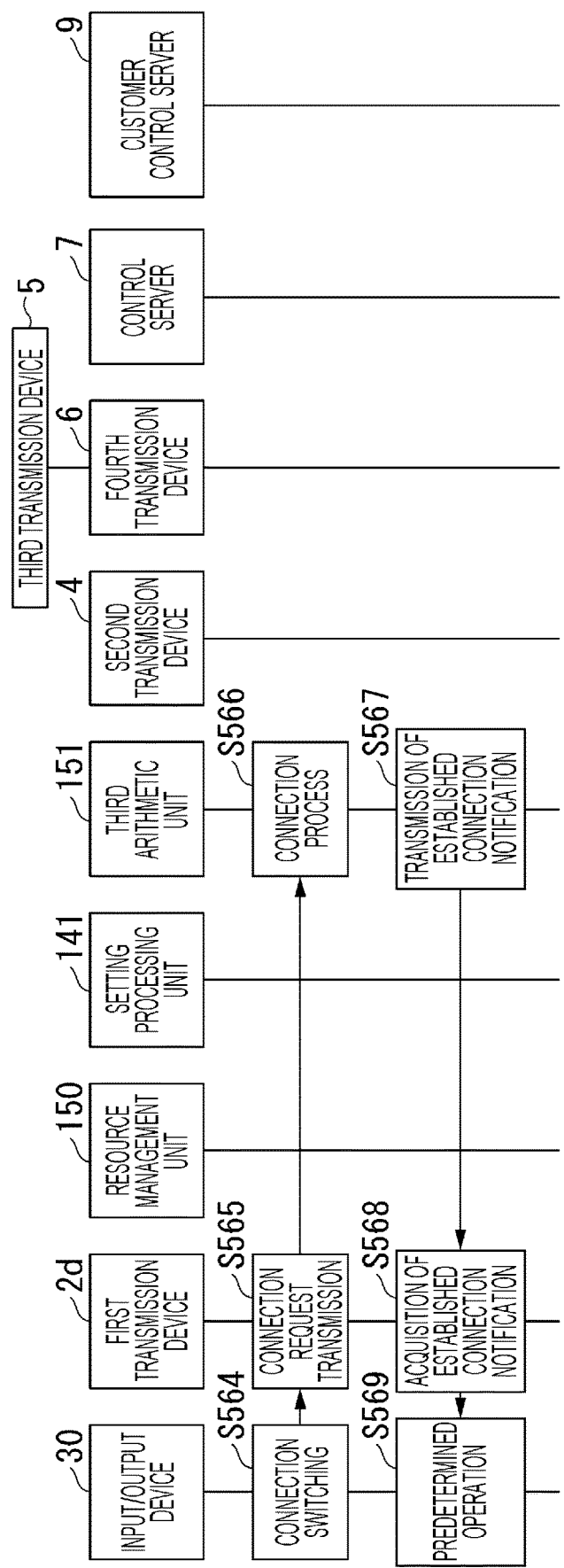
FIG. 22 is a sequence diagram illustrating an example operation of switching the connection of an input/output device in the fourth embodiment.

FIG. 22 is a sequence diagram illustrating an example operation of switching the connection of input/output device 30. The user may switch the connection between the input/output device 30 and the first transmission device 2d for a reason such as a network setting change.

In response to an operation by the user, the input/output device 30 transmits a request for a connection between the input/output device 30 and the setting processing unit 141, to the first transmission device 2d (step S564). The first transmission device 2d transmits the connection request to the third arithmetic unit 151 via the connection line (step S565). On the basis of the connection request, the third arithmetic unit 151 performs a process (a connection process) of establishing a connection between the input/output device 30 and the third arithmetic unit 151 (step S566). The distribution at the multiplexing/demultiplexing unit 26 may be performed so that a connection to the setting change communication unit 24 and a connection to the data communication unit 25 are switched by a specific signal from the input/output device 30 operated by the user. The specific signal is formed with simultaneous inputs from specific keys on a keyboard, for example. Further, the switching of allocation may be performed with a physical switch provided on the first transmission device 2d.

The third arithmetic unit 151 transmits a notification of the established connection to the first transmission device 2d (step S567). The first transmission device 2d acquires the notification of the established connection. The first transmission device 2d transmits a process result based on the notification of the established connection to the input/output device 30 (step S568). The input/output device 30 performs a predetermined operation on the basis of the process result based on the notification of the established connection (step S569).

Figure 23:
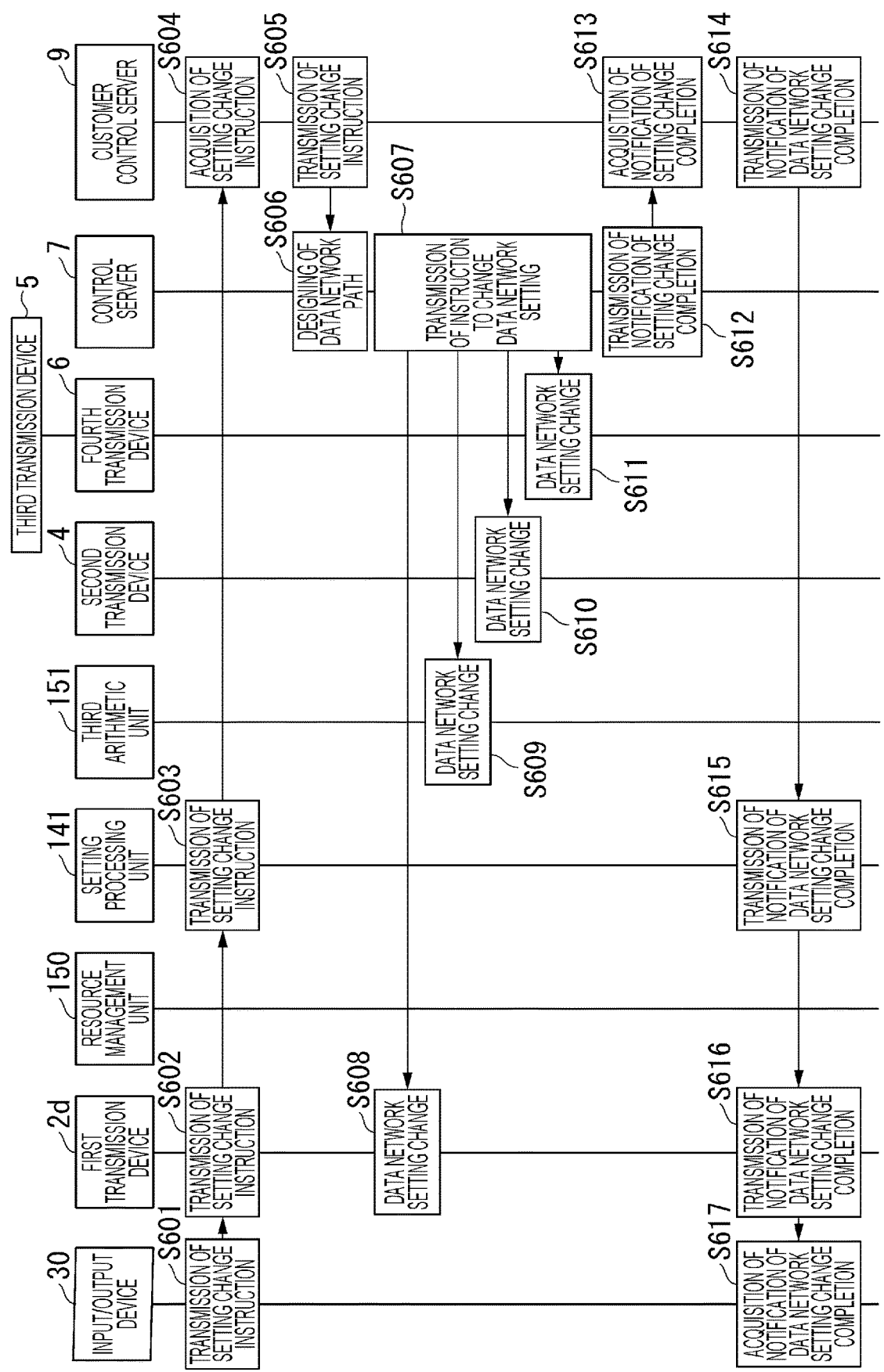
FIG. 23 is a sequence diagram illustrating an example operation of changing the setting of the data network in the fourth embodiment.

FIG. 23 is a sequence diagram illustrating an example operation of changing the setting of the data network. The respective operations from step S601 to step S606 are the same as the respective operations from step S401 to step S406 illustrated in FIG. 13. On the basis of a result of the designing of the communication path, the control server 7 transmits an instruction to change the setting of the data network, to the first transmission device 2d, the third arithmetic unit 151, the second transmission device 4, the third transmission device 5, and the fourth transmission device 6 (step S607).

On the basis of the instruction to change the setting of the data network, the first transmission device 2d changes the setting (the communication speed, for example) of the data network (a data line) (step S608). The third arithmetic unit 151 changes the setting of the data network 12 (step S609). The second transmission device 4 changes the setting of the data network 12 (step S610). The third transmission device 5 and the fourth transmission device 6 change the setting of the data network 12 (step S611). The control server 7 transmits a notification of completion of the setting change in the data network, to the customer control server 9 (step S612). The customer control server 9 acquires the notification of completion of the setting change in the data network (step S613).

The customer control server 9 transmits a notification of completion of the setting change in the data network, to the setting processing unit 141 (step S614). The setting processing unit 141 transmits the notification of completion of the setting change in the data network, to the first transmission device 2d (step S615). The first transmission device 2d transmits the notification of completion of the setting change in the data network, to the input/output device 30 (step S616). The input/output device 30 acquires the notification of completion of the setting change in the data network (step S617).

As described above, in a case where a predetermined input/output device 30 is connected to the first transmission device 2d, the third arithmetic unit 151 (arithmetic processor) performs a process corresponding to the operation of the input/output device 30. The third arithmetic unit 151 transmits the execution result to the first transmission device 2d. The first transmission device 2d may transmit the execution result to the input/output device 30.

When the user simply connects the first transmission device 2d to the optical transmission line 10 in a physical manner as above, three kinds of communication networks, which are the control line of the control network 11, the data line of the data network 12, and the setting change line of the customer control network 13, are automatically constructed between the office 100 and the first station 200. With this arrangement, the user can quickly use and change communication services.

Also, when the user simply connects an input/output device 30 (a monitor, a mouse, a speaker, a camera, or any of various sensors, for example) prepared by the user to the first transmission device 2d, the user can use the input/output device 30. That is, the user can use a virtual personal computer.

Note that the fourth embodiment is based on the second embodiment, but may be based on the first embodiment or the third embodiment. The embodiments may be combined. Further, in each embodiment, the data network 12 may be connected to the Internet.

Note that a communication path from the third arithmetic unit 151 to the Internet may be separately constructed according to a sequence shown in FIG. 23 so that the third arithmetic unit 151 can be connected to the Internet or the like. At that stage, the third arithmetic unit 151 is connected to a communication path different from the communication path connected to the first arithmetic device 3 and the communication path connected to the Internet.

In the fourth embodiment, the setting processing unit 141 and the third arithmetic unit 151 are constructed under different management devices. However, the positions at which the resources are constructed are not limited to the positions suggested in the fourth embodiment, and both functional units may be constructed in the first station 200, for example. Also, the positions where the resources are constructed may be the opposite of the positions suggested in the fourth embodiment. In this case, the fourth transmission device 6 may include at least one of the functional units of the second transmission device 4.

The number of transmission devices included in the communication system is not necessarily three. The communication system may include any number of transmission devices. Further, some or all of those transmission devices may include a multiplexing/demultiplexing unit.

As for the multiplexing/demultiplexing method for the three kinds of communication networks, in a case where an existing technique related to the overhead portion, the payload portion, and the like of an OTU is clearly defined as the technique for multiplexing/demultiplexing, for example, a setting process may be performed without the use of any multiplexing/demultiplexing unit when the specific line networks (a control network, a data network, and a customer control network) are constructed. For example, a multiplexing/demultiplexing unit by the existing technique may be used to construct the data network connected to the data line, and the multiplexing/demultiplexing unit 26 and the multiplexing/demultiplexing unit 45 may not be used.

In the above description, the series of communication networks are connected to a server or the like from the first transmission device via various communication networks, but an optical signal transmitted through the optical transmission line 10 may be temporarily converted into an electrical signal at a relay point (the second transmission device 4, for example). The converted electrical signal may then be transmitted to the communication network to which the corresponding server and device belong. The converted electrical signal may be further converted into another optical signal and be transmitted. Note that such transmission also applies to signals to be transmitted from various servers to the first transmission device side. Also, such signals may be converted one or more times at a relay point.

A communication unit and a processing unit may operate as an integrated functional unit. For example, the connection processing unit 23 and the control communication unit 22 may operate as an integrated functional unit. For example, the connection processing unit 42 and the control communication unit 41 may operate as an integrated functional unit.
(Example Hardware Configuration)

Figure 24:
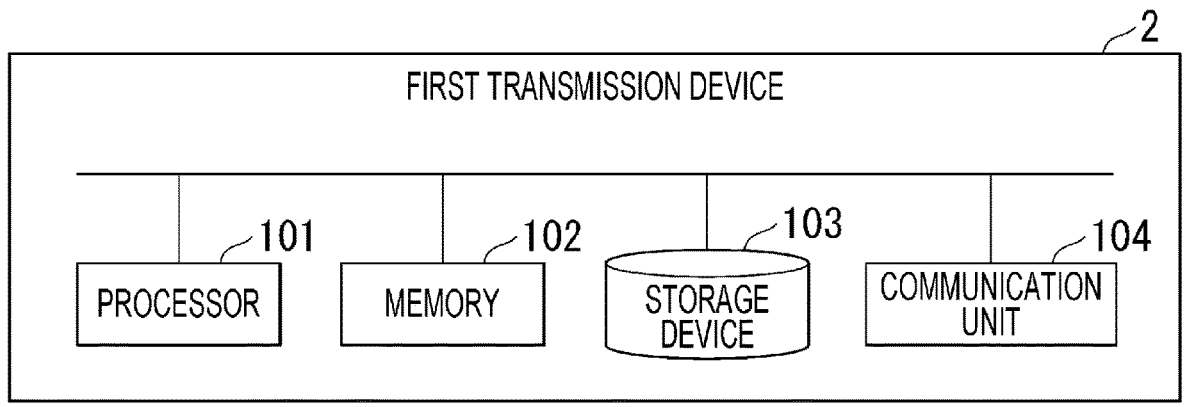
FIG. 24 is a diagram illustrating an example hardware configuration of a communication system in each embodiment.
Figure 25:
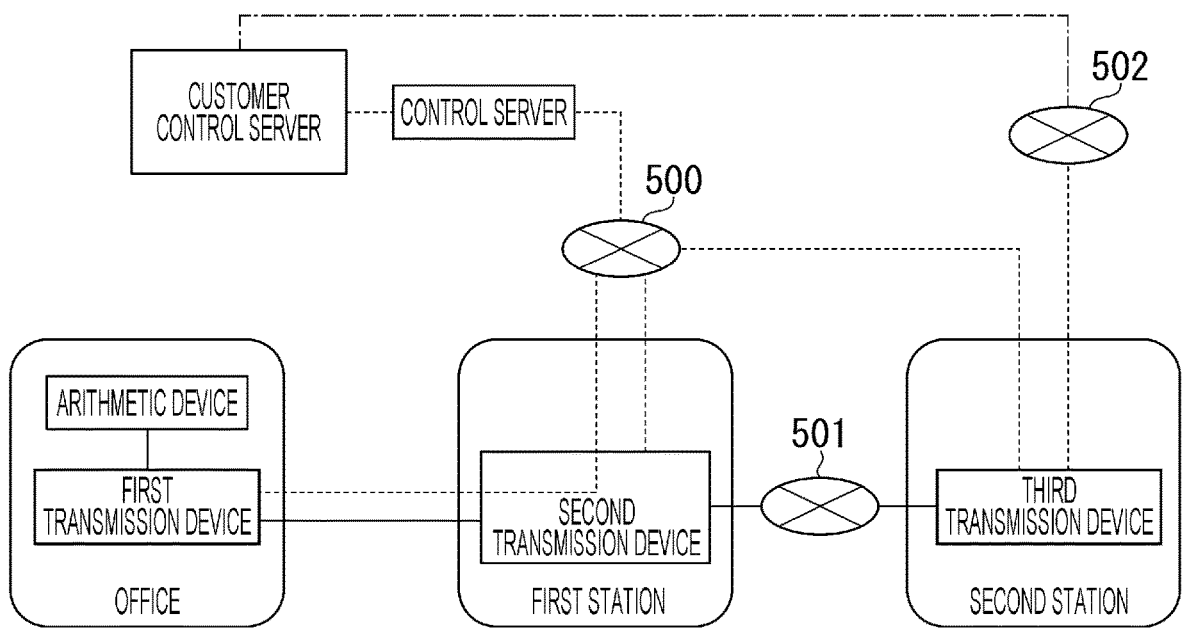
FIG. 25 is a diagram illustrating a first example of a configuration of a communication system.
Figure 26:
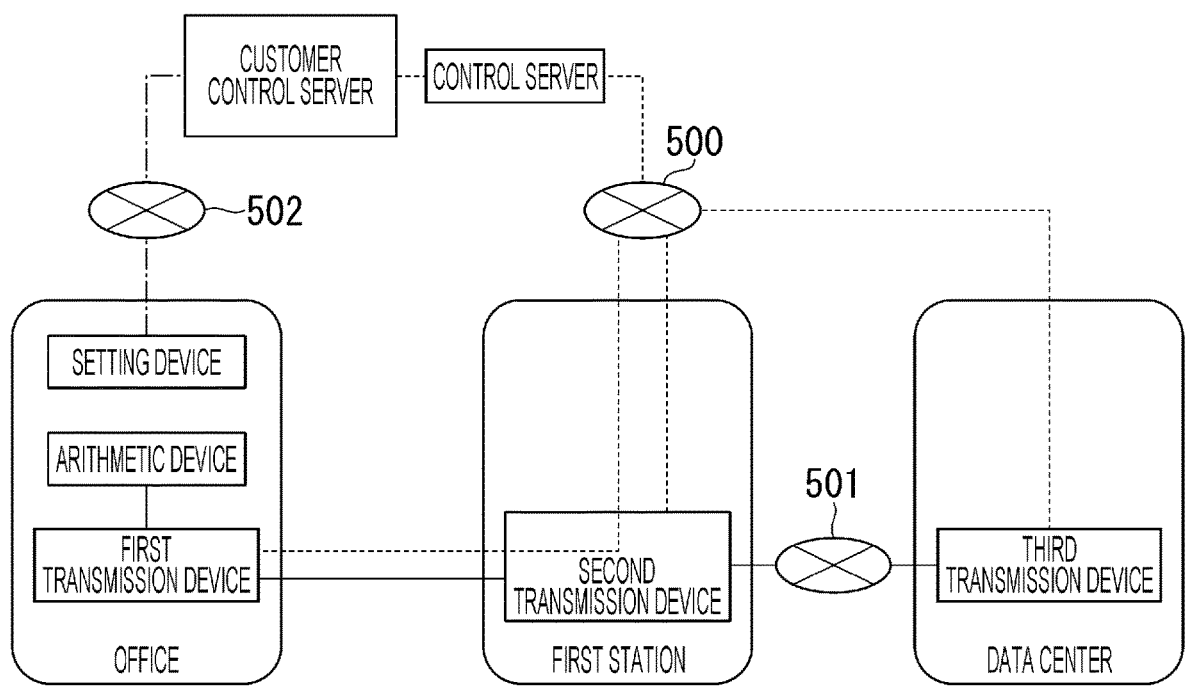
FIG. 26 is a diagram illustrating a second example of a configuration of a communication system.

FIG. 24 is a diagram illustrating an example hardware configuration of the first transmission device 2 in each embodiment. The first transmission device 2 corresponds to each of the first transmission device 2a, the first transmission device 2b, the first transmission device 2c, and the first transmission device 2d. Some or all of the functional units of the first transmission device 2 are formed as software by a processor 101 such as a CPU executing a program stored in a storage device 103 including a nonvolatile recording medium (non-transitory recording medium) and a memory 102. The program may be recorded in a computer-readable recording medium. The computer-readable recording medium is a portable medium such as a flexible disk, a magneto-optical disc, a read-only memory (ROM), or a compact disc read-only memory (CD-ROM), or a non-transitory recording medium such as a storage device like a hard disk installed in a computer system, for example. A communication unit 104 may acquire the program.

Some or all of the functional units of the first transmission device 2 may be formed with hardware including an electronic circuit (circuitry) in which a large-scale integrated circuit (LSI), an application specific integrated circuit (ASIC), a programmable logic device (PLD), a field programmable gate array (FPGA), or the like is used, for example.

Although the embodiments of the present invention have been described in detail with reference to the drawings, specific configurations are not limited to these embodiments, and include any designs and the like within the scope of the invention.

INDUSTRIAL APPLICABILITY

The present invention can be applied to optical communication systems.

REFERENCE SIGNS LIST 1a, 1b, 1c, 1d Communication system
2, 2a, 2b, 2c, 2d First transmission device
3 First arithmetic device
4 Second transmission device
5 Third transmission device
6 Fourth transmission device
7 Control server
8 Second arithmetic device
9 Customer control server
10 Optical transmission line
11 Control network
12 Data network
13 Customer control network
14 Management device
15 Management device
20 Setting processing unit
21 Device control unit
22 Control communication unit
23 Connection processing unit
24 Setting change communication unit
25 Data communication unit
26 Multiplexing/demultiplexing unit
27 Optical signal communication unit
28 Signal switching unit
30 Input/output device
31 First arithmetic unit
32 Device connection unit
40 Device control unit
41 Control communication unit
42 Connection processing unit
43 Setting change communication unit
44 Data communication unit
50 Data communication unit
51 Optical signal communication unit
52 Device control unit
60 Device control unit
61 Data communication unit
62 Optical signal communication unit
81 Second arithmetic unit
100 Office
101 Processor
102 Memory
103 Storage device
104 Communication unit
140 Resource management unit
141 Setting processing unit
150 Resource management unit
151 Third arithmetic unit
200 First station
300 Data center
400 Second station
500 Control network
501 Data network
502 Internet

The invention claimed is:

1. A communication system comprising: a plurality of transmission devices; a setting server that receives an instruction to change data related to setting of a data network; and a control server that performs a control process related to the plurality of transmission devices and the data network on a basis of the data, wherein
the plurality of transmission devices includes a first transmission device, and a second transmission device communicating with the setting server and the control server,
a setting processor is provided to transmits a request for constructing a customer control network between the first transmission device and the setting server by using the second transmission device as a relay device, when the first transmission device and the second transmission device are connected by an optical transmission line, and
the first transmission device includes:
a first connection processor that transmits a request for constructing a control network between the first transmission device and the control server by using the second transmission device as the relay device, when the first transmission device and the second transmission device are connected by the optical transmission line; and
a first device controller that transmits a request for constructing the data network for the first transmission device by using the second transmission device as the relay device, when the first transmission device and the second transmission device are connected by the optical transmission line, and
the second transmission device includes:
a second connection processor that transfers the request for the constructing the control network, the data network and the customer control network to the control server using control signals; and
a second device controller that changes the settings of a multiplexer/demultiplexer performing multiplexing and demultiplexing processes of the control signals in the second transmission device, on the basis of instructions from the control server,
wherein the second device controller dynamically changes the ratio of the numbers of slots allocated to each of the control network, the data network and the customer control network, on the basis of instructions from the control server after each of the control network, the data network and the customer control network is constructed.

2. The communication system according to claim 1, wherein
the setting processor is included in one of the first transmission device, a management device in the second transmission device, and the setting server.

3. The communication system according to claim 1, wherein
the first transmission device further includes:
an optical signal communicator that communicates with the second transmission device, using the optical transmission line; and
a multiplexer/demultiplexer that demultiplexes a signal acquired from the second transmission device and transmits the signal to the first connection processor, and multiplexes a signal acquired from the first connection processor and transmits the signal to the optical signal communicator.

4. The communication system according to claim 1, further comprising
an arithmetic processor that performs a process in accordance with an operation of a predetermined input/output device and transmits an execution result to the first transmission device, when the input/output device is connected to the first transmission device.

5. A communication method implemented by a communication system that includes: a plurality of transmission devices; a setting server that receives an instruction to change data related to setting of a data network; and a control server that performs a control process related to the plurality of transmission devices and the data network on a basis of the data,
the plurality of transmission devices including a first transmission device, and a second transmission device communicating with the setting server and the control server,
the communication method comprising
a setting processing step of transmitting a request for constructing a customer control network between the first transmission device and the setting server by using the second transmission device as a relay device, when the first transmission device and the second transmission device are connected by an optical transmission line,
wherein the first transmission device
transmits a request for constructing a control network between the first transmission device and the control server by using the second transmission device as the relay device, when the first transmission device and the second transmission device are connected by the optical transmission line, and
transmits a request for constructing the data network for the first transmission device by using the second transmission device as the relay device, when the first transmission device and the second transmission device are connected by the optical transmission line,
wherein the second transmission device
transfers a request for the constructing the control network, the data network and the customer control network to the control server using control signals, and
changes the settings of a multiplexer/demultiplexer performing multiplexing and demultiplexing processes of the control signals in the second transmission device, on the basis of instructions from the control server,
wherein the second device controller dynamically changes the ratio of the numbers of slots allocated to each of the control network, the data network and the customer control network, on the basis of instructions from the control server after each of the control network, the data network and the customer control network is constructed.

6. A non-transitory computer readable storing a program for causing a computer to function as the communication system according to claim 1.

* * * * *